United States Patent
Zhang et al.

(10) Patent No.: US 9,961,604 B2
(45) Date of Patent: May 1, 2018

(54) RADIO NETWORK INFORMATION MANAGEMENT METHOD AND NETWORK DEVICE

(71) Applicant: Huawei Technologies Co., Ltd., Shenzhen (CN)

(72) Inventors: Liwen Zhang, Shanghai (CN); Kai Xu, Shanghai (CN); Yuhong Dai, Shenzhen (CN); Liang Xu, Shanghai (CN); Lin Zhou, Shanghai (CN); Xiaoyi Cui, Shanghai (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 236 days.

(21) Appl. No.: 14/935,093

(22) Filed: Nov. 6, 2015

(65) Prior Publication Data

US 2016/0066238 A1 Mar. 3, 2016

Related U.S. Application Data

(63) Continuation of application No. PCT/CN2013/075294, filed on May 8, 2013.

(51) Int. Cl.
*H04W 36/22* (2009.01)
*H04W 64/00* (2009.01)
(Continued)

(52) U.S. Cl.
CPC .......... *H04W 36/22* (2013.01); *G01S 5/0252* (2013.01); *G01S 5/14* (2013.01); *H04W 36/0061* (2013.01);
(Continued)

(58) Field of Classification Search
CPC . H04W 36/22; H04W 64/00; H04W 36/0061; H04W 36/14; H04W 28/08; G01S 5/0252; G01S 5/14
See application file for complete search history.

(56) References Cited

U.S. PATENT DOCUMENTS 9,439,167 B2 * 9/2016 MacDonald .......... G01S 5/0252
2011/0170435 A1 * 7/2011 Kim ...................... H04L 5/0023
370/252
(Continued)

FOREIGN PATENT DOCUMENTS

AU 2003250300 A1 3/2004
CN 101998624 A 3/2011
(Continued)

*Primary Examiner* — Ajay Cattungal
(74) *Attorney, Agent, or Firm* — Slater Matsil, LLP

(57) ABSTRACT

Embodiments disclose a radio network information management method and a network device. A radio network information management method is disclosed, where the method includes determining that a user equipment UE exists in a first mobility management unit, and determining radio network information of the first mobility management unit according to measurement statistic information of the UE in the first mobility management unit. It is therefore implemented that a granularity of acquiring and managing radio network information in a cell is per mobility management unit, and for a complex cell coverage environment, difference a neighboring cells between different areas of the cell and difference about interference between different areas of the cell are specified. The embodiments further disclose a network device.

20 Claims, 8 Drawing Sheets

(51) Int. Cl.
*G01S 5/02* (2010.01)
*G01S 5/14* (2006.01)
*H04W 36/00* (2009.01)
*H04W 36/14* (2009.01)
*H04W 28/08* (2009.01)

(52) U.S. Cl.
CPC ........... *H04W 36/14* (2013.01); *H04W 64/00* (2013.01); *H04W 28/08* (2013.01)

(56) References Cited

U.S. PATENT DOCUMENTS

| | | | |
|---|---|---|---|
| 2011/0177549 A1* | 7/2011 | Glukhman | C12M 41/36 435/39 |
| 2011/0237252 A1* | 9/2011 | Kim | H04W 36/0083 455/434 |
| 2011/0292821 A1* | 12/2011 | Chin | H04W 36/0066 370/252 |
| 2013/0150066 A1* | 6/2013 | Pokhariyal | H04W 24/00 455/452.1 |
| 2013/0322395 A1* | 12/2013 | Kazmi | H04W 72/082 370/329 |
| 2014/0162567 A1* | 6/2014 | Hellfajer | H04W 24/00 455/67.13 |
| 2014/0226630 A1* | 8/2014 | Comstock | H04W 16/14 370/331 |
| 2014/0315555 A1* | 10/2014 | Zhang | H04W 36/0094 455/437 |
| 2014/0328309 A1* | 11/2014 | Comstock | H04W 72/082 370/329 |

FOREIGN PATENT DOCUMENTS

| | | |
|---|---|---|
| CN | 102685881 A | 9/2012 |
| JP | 2005509136 A | 4/2005 |
| KR | 1020040042648 A | 5/2004 |
| KR | 101199573 B1 | 11/2012 |
| WO | 0028272 A2 | 5/2000 |
| WO | 0030384 | 5/2000 |
| WO | 0128272 A1 | 4/2001 |
| WO | 02082832 A2 | 10/2002 |
| WO | 2004017660 A1 | 2/2004 |
| WO | 2013034191 A1 | 3/2013 |

* cited by examiner

RADIO NETWORK INFORMATION MANAGEMENT METHOD AND NETWORK DEVICE

This application is a continuation of International Application No. PCT/CN2013/075294, filed on May 8, 2013, which is hereby incorporated by reference in its entirety.

TECHNICAL FIELD

Embodiments relate to the communications field, and in particular, to a radio network information management method and a network device.

BACKGROUND

With popularization of intelligent terminals, abundant services drive vigorous development of mobile broadband (MMB), and network traffic explosively increases. To satisfy requirements of capacity growth in the future, to change and optimize a network structure and build a multi-layer heterogeneous network (HetNet) with multiple frequency bands, multiple standards, and multiple forms becomes a necessity for network development in the future.

A coverage area of a cell, be it a macro cell or a micro cell, in the Hetnet is large. For example, a coverage radius of a macro cell is 500 meters to 25 kilometers, while a coverage radius of a micro cell is approximately 30 meters to 300 meters. Due to complexity of a radio environment, such as refraction/block from a high building, an intra-frequency repeater, and intra-frequency macro and micro hybrid networks, it is difficult to perform differential management on different areas of a cell, and the maximum capacity and the best key performance indicator (KPI) that are of the entire network cannot be ensured.

SUMMARY

In view of this, embodiments provide a radio network information management method to implement differential management of cells.

According to a first aspect, a radio network information management method is provided and includes determining that a user equipment UE exists in a first mobility management unit, where the first mobility management unit is an area obtained by dividing a first cell. The method also includes determining radio network information of the first mobility management unit according to measurement statistic information of the UE in the first mobility management unit, where the radio network information includes at least one type of the following information: signal strength information of the first cell in the first mobility management unit, signal strength information of at least one neighboring cell of the first cell in the first mobility management unit, or a statistic value of at least one key performance indicator KPI in the first mobility management unit.

In a first possible implementation manner of the first aspect, the first mobility management unit is an area obtained by dividing the first cell according to geographical location information of the first cell; and the determining that a UE exists in a first mobility management unit includes: if a geographical location in which at least one UE is located is within a geographical range of the first mobility management unit, determining that the UE exists in the first mobility management unit.

In a second possible implementation manner of the first aspect, the first mobility management unit is an area obtained by dividing the first cell according to a signal strength feature of a cell in a first cell set, where the first cell set includes at least the first cell. The determining that a UE exists in a first mobility management unit includes determining, according to signal strength that is of the cell in the first cell set and obtained from the UE, that the UE exists in the first mobility management unit.

With reference to the second possible implementation manner of the first aspect, in a third possible implementation manner of the first aspect, the first cell set further includes a neighboring cell of the first cell.

With reference to the second possible implementation manner of the first aspect or the third possible implementation manner of the first aspect, in a fourth possible implementation manner of the first aspect, the signal strength feature of the cell in the first cell set includes a signal strength range of the cell in the first cell set. The determining, according to signal strength that is of the cell in the first cell set and obtained from the UE in the first cell, that the UE exists in the first mobility management unit includes: if the signal strength that is of the cell in the first cell set and obtained from at least one UE is respectively within a signal strength range of a corresponding cell in the first cell set in the first mobility management unit, determining that the UE exists in the first mobility management unit.

With reference to the third possible implementation manner of the first aspect, in a fifth possible implementation manner of the first aspect, the signal strength feature of the cell in the first cell set includes a signal strength comparison relationship of cells in the first cell set; and the determining, according to signal strength that is of the cell in the first cell set and obtained from the UE in the first cell, that the UE exists in the first mobility management unit includes: if a comparison relationship of signal strength that is of cells in the first cell set and obtained from at least one UE meets a signal strength comparison relationship of corresponding cells in the first cell set in the first mobility management unit, determining that the UE exists in the first mobility management unit.

With reference to the third possible implementation manner of the first aspect, in a sixth possible implementation manner of the first aspect, the signal strength feature of the cell in the first cell set includes a signal strength range of the cell in the first cell set and a signal strength comparison relationship of cells in the first cell set. The determining, according to signal strength that is of the cell in the first cell set and obtained from the UE in the first cell, that the UE exists in the first mobility management unit includes: if the signal strength that is of the cell in the first cell set and obtained from at least one UE is respectively within a signal strength range of a corresponding cell in the first cell set in the first mobility management unit, and a comparison relationship of signal strength that is of cells in the first cell set and obtained from at least one UE meets a signal strength comparison relationship of corresponding cells in the first cell set in the first mobility management unit, determining that the UE exists in the first mobility management unit.

With reference to the first aspect or the foregoing possible implementation manners of the first aspect, in a seventh possible implementation manner of the first aspect, the KPI includes at least one of the following: a call drop rate, channel usage, a handover success rate, or an access success rate.

With reference to the first aspect or the foregoing possible implementation manners of the first aspect, in an eighth possible implementation manner of the first aspect, the method further includes: determining that the first mobility management unit includes a second mobility management unit, where the second mobility management unit is an area obtained by dividing a second cell; and combining radio network information of the second mobility management unit with the radio network information of the first mobility management unit.

With reference to the eighth possible implementation manner of the first aspect, in a ninth possible implementation manner of the first aspect, the second cell and the first cell are cells that belong to different systems.

With reference to the eighth possible implementation manner of the first aspect or the ninth possible implementation manner of the first aspect, in a tenth possible implementation manner of the first aspect, the second mobility management unit is obtained by dividing the second cell in the following manner: the second mobility management unit is an area obtained by dividing the second cell according to geographical location information of the second cell; or the second mobility management unit is an area obtained by dividing according to a signal strength feature of a cell in a second cell set, where the second cell set includes at least the second cell.

With reference to the first aspect or the foregoing possible implementation manners of the first aspect, in an eleventh possible implementation manner of the first aspect, the method further includes: executing radio resource management according to the radio network information of the first mobility management unit.

According to a second aspect, a radio network information management method is provided and includes: receiving, by a user equipment UE, control information of a network device in a first cell, where the control information is determined by the network device according to radio network information of a first mobility management unit in which the UE is located, the first mobility management unit is an area obtained by dividing the first cell, and the radio network information of the first mobility management unit includes at least one type of the following information: signal strength information of the first cell in the first mobility management unit, signal strength information of at least one neighboring cell of the first cell in the first mobility management unit, or a statistic value of at least one key performance indicator KPI in the first mobility management unit; and completing, by the UE, access or handover in the first cell or a neighboring cell of the first cell according to the control information.

In a first possible implementation manner of the second aspect, the first mobility management unit is an area obtained by the network device by dividing the first cell according to geographical location information of the first cell.

In a second possible implementation manner of the second aspect, the first mobility management unit is an area obtained by the network device by dividing the first cell according to a signal strength feature of a cell in a first cell set, where the first cell set includes at least the first cell.

With reference to the second possible implementation manner of the second aspect, in a third possible implementation manner of the second aspect, the first cell set further includes the neighboring cell of the first cell.

With reference to the second possible implementation manner of the second aspect or the third possible implementation manner of the second aspect, in a fourth possible implementation manner of the second aspect, the signal strength feature of the cell in the first cell set includes at least one of the following: a signal strength range of the cell in the first cell set, or a signal strength comparison relationship of cells in the first cell set.

According to a third aspect, a network device is provided, where the network device includes: a first determining unit, configured to determine that a user equipment UE exists in a first mobility management unit, where the first mobility management unit is an area obtained by dividing a first cell; and a second determining unit, configured to determine radio network information of the first mobility management unit according to measurement statistic information of the UE in the first mobility management unit, where the radio network information includes at least one type of the following information: signal strength information of the first cell in the first mobility management unit, signal strength information of at least one neighboring cell of the first cell in the first mobility management unit, or a statistic value of at least one key performance indicator KPI in the first mobility management unit.

In a first possible implementation manner of the third aspect, the first mobility management unit is an area obtained by dividing the first cell according to geographical location information of the first cell; and the first determining unit is specifically configured to: if a geographical location in which at least one UE is located is within a geographical range of the first mobility management unit, determine that the UE exists in the first mobility management unit.

In a second possible implementation manner of the third aspect, the first mobility management unit is an area obtained by dividing the first cell according to a signal strength feature of a cell in a first cell set, where the first cell set includes at least the first cell; and the first determining unit is specifically configured to determine, according to signal strength that is of the cell in the first cell set and obtained from the UE, that the UE exists in the first mobility management unit.

With reference to the second possible implementation manner of the third aspect, in a third possible implementation manner of the third aspect, the first cell set further includes a neighboring cell of the first cell.

With reference to the second possible implementation manner of the third aspect or the third possible implementation manner of the third aspect, in a fourth possible implementation manner of the third aspect, the signal strength feature of the cell in the first cell set includes a signal strength range of the cell in the first cell set; and the first determining unit is specifically configured to: if the signal strength that is of the cell in the first cell set and obtained from at least one UE is respectively within a signal strength range of a corresponding cell in the first cell set in the first mobility management unit, determine that the UE exists in the first mobility management unit.

With reference to the third possible implementation manner of the third aspect, in a fifth possible implementation manner of the third aspect, the signal strength feature of the cell in the first cell set includes a signal strength comparison relationship of cells in the first cell set; and the first determining unit is specifically configured to: if a comparison relationship of signal strength that is of cells in the first cell set and obtained from at least one UE meets a signal strength comparison relationship of corresponding cells in the first cell set in the first mobility management unit, determine that the UE exists in the first mobility management unit.

With reference to the third possible implementation manner of the third aspect, in a sixth possible implementation manner of the third aspect, the signal strength feature of the cell in the first cell set includes a signal strength range of the cell in the first cell set and a signal strength comparison relationship of cells in the first cell set; and the first determining unit is specifically configured to: if the signal strength that is of the cell in the first cell set and obtained from at least one UE is respectively within a signal strength range of a corresponding cell in the first cell set in the first mobility management unit, and a comparison relationship of signal strength that is of cells in the first cell set and obtained from the at least one UE meets a signal strength comparison relationship of corresponding cells in the first cell set in the first mobility management unit, determine that the UE exists in the first mobility management unit.

With reference to the third aspect or the foregoing possible implementation manners of the third aspect, in a seventh possible implementation manner of the third aspect, the KPI includes at least one of the following: a call drop rate, channel usage, a handover success rate, or an access success rate.

With reference to the third aspect or the foregoing possible implementation manners of the third aspect, in an eighth possible implementation manner of the third aspect, the network device further includes a third determining unit, configured to determine that the first mobility management unit includes a second mobility management unit, where the second mobility management unit is an area obtained by dividing a second cell. The device also includes an information combination unit, configured to combine radio network information of the second mobility management unit with the radio network information of the first mobility management unit.

With reference to the eighth possible implementation manner of the third aspect, in a ninth possible implementation manner of the third aspect, the second cell and the first cell are cells that belong to different systems.

With reference to the eighth possible implementation manner of the third aspect or the ninth possible implementation manner of the third aspect, in a tenth possible implementation manner of the third aspect, the second mobility management unit is obtained by dividing the second cell in the following manner: the second mobility management unit is an area obtained by dividing the second cell according to geographical location information of the second cell; or the second mobility management unit is an area obtained by dividing the second cell according to a signal strength feature of a cell in a second cell set, where the second cell set includes at least the second cell.

With reference to the third aspect or the foregoing possible implementation manners of the third aspect, in an eleventh possible implementation manner of the third aspect, the network device further includes a resource management unit, configured to execute radio resource management according to the radio network information of the first mobility management unit.

With reference to the third aspect or the foregoing possible implementation manners of the third aspect, in a twelfth possible implementation manner of the third aspect, the network device includes at least one of the following: a radio network controller RNC, a base station controller BSC, an evolved NodeB eNodeB, an access controller AC, or a centralized control device.

According to a fourth aspect, a user equipment UE is provided, where the user equipment UE includes a receiving unit, configured to receive control information of a network device; and a processing unit, configured to complete access or handover in a first cell or a neighboring cell of the first cell according to the control information that is received by the receiving unit in the first cell, where the control information is determined by the network device according to radio network information of a first mobility management unit in which the UE is located, and the radio network information of the first mobility management unit includes at least one type of the following information: signal strength information of the first cell in the first mobility management unit, signal strength information of at least one neighboring cell of the first cell in the first mobility management unit, or a statistic value of at least one key performance indicator KPI in the first mobility management unit.

In a first possible implementation manner of the fourth aspect, the first mobility management unit is an area obtained by the network device by dividing the first cell according to geographical location information of the first cell.

In a second possible implementation manner of the fourth aspect, the first mobility management unit is an area obtained by the network device by dividing the first cell according to a signal strength feature of a cell in a first cell set, where the first cell set includes at least the first cell.

With reference to the second possible implementation manner of the fourth aspect, in a third possible implementation manner of the fourth aspect, the first cell set further includes the neighboring cell of the first cell.

With reference to the second possible implementation manner of the fourth aspect or the third possible implementation manner of the fourth aspect, in a fourth possible implementation manner of the fourth aspect, the signal strength feature of the cell in the first cell set includes at least one of the following: a signal strength range of the cell in the first cell set, or a signal strength comparison relationship of cells in the first cell set.

By using the foregoing solutions, it is implemented that a granularity of acquiring and managing radio network information in a cell is per mobility management unit, and for a complex cell coverage environment, difference about neighboring cells between different areas of the cell and difference about interference between different areas of the cell are specified.

DETAILED DESCRIPTION OF ILLUSTRATIVE EMBODIMENTS

The following clearly and completely describes the technical solutions in the embodiments with reference to the accompanying drawings. Apparently, the described embodiments are merely a part rather than all of the embodiments of the present invention. All other embodiments obtained by a person of ordinary skill in the art based on the embodiments of without creative efforts shall fall within the protection scope of the present invention.

The method and the network device in the embodiments may be implemented by using a centralized control device or a base station device such as a radio network controller (RNC), a base station controller (BSC), an evolved NodeB (eNodeB), or an access controller (AC). The centralized control device may be connected to the base station device such as the RNC, the BSC, the eNodeB, or the AC, and may be used to transfer and collect information between communications systems of multiple standards, or perform centralized control on a user equipment (UE). The communications systems of multiple standards may include: Global System for Mobile Communications (GSM), Universal Mobile Telecommunications System (UMTS), a Long Term Evolution (LTE) system or a subsequent evolution system of LTE, a wireless local area network (WLAN), CDMA, WiMax, and the like.

Figure 1:
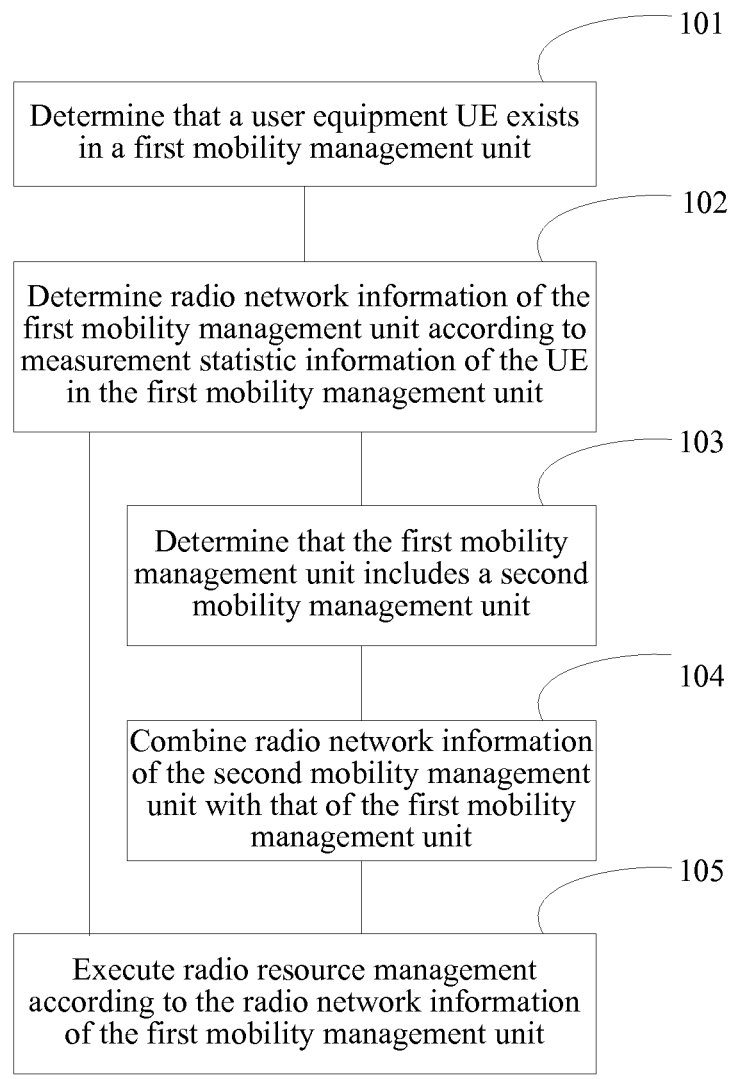
FIG. 1 is a flowchart of a network information management method according to an embodiment.

FIG. 1 is a flowchart of a network information management method according to an embodiment. As shown in FIG. 1, the method may include the following steps.

Step 101: Determine that a user equipment UE exists in a first mobility management unit.

The first mobility management unit is an area obtained by dividing a first cell, where the first cell may be a cell in a communications system of any standard, for example, a GSM system, a UMTS system, or an LTE system. A coverage area of the first mobility management unit is less than or equal to that of the first cell, and may be used to perform differential mobility management on the UE according to subdivided areas in the first cell.

The first mobility management unit may be obtained by dividing the first cell in multiple manners, and the first mobility management unit has an area feature of the covered area.

For example, the first mobility management unit may be an area obtained by dividing the first cell according to geographical location information of the first cell. In a possible implementation manner, the geographical location information of the first cell may be a longitude interval and a latitude interval. At least one longitude sub-interval and at least one latitude sub-interval are obtained by dividing the longitude interval and the latitude interval of the first cell. A geographical range of the first mobility management unit may be determined by one of the longitude sub-intervals and one of the latitude sub-intervals. For example, the geographical range of the first mobility management unit is an area determined by a longitude sub-interval (116.12345° to 116.12395°) and a latitude sub-interval (90.12746° to 90.12846°).

If the first mobility management unit is the area obtained by dividing the first cell according to the geographical location information of the first cell, if a geographical location in which at least one UE in the first cell is located is within the geographical range of the first mobility management unit, it may be determined that the UE exists in the first mobility management unit. For example, the geographical range of the first mobility management unit is the longitude sub-interval (116.12345° to 116.12395°) and the latitude sub-interval (90.12746° to 90.12846°), if a geographical location of the UE is (longitude 116.12350°, latitude 90.12750°), that is, the graphical location in which the UE is located is within the geographical range of the first mobility management unit, it may be determined that the UE exists in the first mobility management unit. The geographical location in which the UE in the first cell is located may be obtained by using multiple positioning methods, such as an assisted global positioning system (A-GPS) and a time difference positioning method, which is not listed herein.

For another example, signal strength that is of the first cell and received by the UE in different areas of the first cell is different, and signal strength that is of a neighboring cell of the first cell and received by the UE in different areas of the first cell is also different. Therefore, the first mobility management unit may be an area obtained by dividing the first cell according to a signal strength feature of a cell in a first cell set. The first cell set may include at least the first cell. Certainly, the first cell set may also include the first cell and at least one neighboring cell of the first cell, where the neighboring cell may include at least one type of the following neighboring cells: an intra-RAT intra-frequency neighboring cell of the first cell, an intra-RAT inter-frequency neighboring cell of the first cell, or an inter-RAT neighboring cell of the first cell. The signal strength feature of the cell in the first cell set includes at least one of the following: a signal strength range of the cell in the first cell set, or a signal strength comparison relationship of cells in the first cell set. For example, the first mobility management unit may be an area obtained by dividing the first cell according to the signal strength range of the cell in the first cell set. The signal strength range of the cell is separately divided to obtain a signal strength sub-interval. The signal strength range of the cell in the first cell set in the first mobility management unit is separately determined by a signal strength sub-interval of a corresponding cell. For another example, the first mobility management unit may be the area obtained by dividing the first cell according to the signal strength comparison relationship of cells in the first cell set. For another example, the first mobility management unit may be an area obtained by dividing the first cell according to the signal strength comparison relationship of cells in the first cell set and the signal strength range of the cell in the first cell set. It should be noted that, the foregoing is only exemplary, and this embodiment of the present invention is not limited thereto.

For cells of different standards, signal strength may be represented in different manners. For example, for a GSM cell, signal strength is represented by a received signal level (RxLev); for a UMTS cell, signal strength may be represented by received signal code power (RSCP) with a unit of dBm, or may be represented by a ratio of energy per chip to the total received power density (Echo) with a unit of dB; for an LTE cell, signal strength may be represented by reference signal received power (RSRP) with a unit of dBm, or may be represented by reference signal received quality (RSRQ) with a unit of dB. The manners are not listed herein, and this embodiment is not limited thereto.

If the first mobility management unit is an area obtained by dividing the first cell according to the signal strength feature of the cell in the first cell set, it may be determined, according to signal strength that is of the cell in the first cell set and obtained from the UE in the first cell, that the UE exists in the first mobility management unit.

For example, the first mobility management unit is the area obtained by dividing the first cell according to the signal strength range of the cell in the first cell set. If signal strength that is of the cell in the first cell set and obtained from at least one UE in the first cell is respectively within a signal strength range of a corresponding cell in the first cell set in the first mobility management unit, it may be determined that the UE exists in the first mobility management unit. For example, the first cell is a UMTS cell 1; intra-frequency neighboring cells of the first cell are a UMTS cell 2 and a UMTS cell 3; the first cell set is (UMTS cell 1, UMTS cell 2, UMTS cell 3); signal strength ranges of the cells in the first cell set in the first mobility management unit are an RSCP sub-interval (−100 dBm to −90 dBm) of the UMTS cell 1, an RSCP sub-interval (−105 dBm to −95 dBm) of the UMTS cell 2, and an RSCP sub-interval (−110 dBm to −100 dBm) of the UMTS cell 3. An RSCP of the UMTS cell 1 measured by the UE in the first cell is −95 dBm, an RSCP of the UMTS cell 2 measured by the UE in the first cell is −100 dBm, and an RSCP of the UMTS cell 3 measured by the UE in the first cell is −105 dBm, that is, signal strength that is of the cell in the first cell set and measured in a location in which the UE is located is respectively within a signal strength range of a corresponding cell in the first cell set in the first mobility management unit. It may be determined that the UE exists in the first mobility management unit. The signal strength that is of the cell and measured by the UE in the first cell may be obtained from a measurement report of the UE.

For another example, the first mobility management unit is the area obtained by dividing the first cell according to the signal strength comparison relationship of cells in the first cell set. If a comparison relationship of signal strength that is of cells in the first cell set and obtained from at least one UE in the first cell meets a signal strength comparison relationship of corresponding cells in the first cell set in the first mobility management unit, it may be determined that the UE exists in the first mobility management unit. For example, the first cell is a GSM cell 1; neighboring cells of the first cell are a GSM cell 2 and a GSM cell 3; the first cell set is (GSM cell 1, GSM cell 2, GSM cell 3); the first mobility management unit is an area in which an RxLev of the GSM cell 1 is greater than an RxLev of the GSM cell 2 and the RxLev of the GSM cell 1 is greater than an RxLev of the GSM cell 3. If the RxLev of the GSM cell 1 measured by the UE is 40, the RxLev of the GSM cell 2 measured by the UE is 20, and the RxLev of the GSM cell 3 measured by the UE is 25, that is, the signal strength comparison relationship that is of cells in the first cell set and measured in a location in which the UE is located meets the signal strength comparison relationship of corresponding cells in the first cell set in the first mobility management unit, it may be determined that the UE exists in the first mobility management unit.

For another example, the first mobility management unit is an area obtained by dividing the first cell according to the signal strength range of the cell in the first cell set and the signal strength comparison relationship of cells in the first cell set. If the signal strength that is of the cell in the first cell set and obtained from at least one UE in the first cell is respectively within a signal strength range of a corresponding cell in the first cell set in the first mobility management unit, and a comparison relationship of signal strength that is of cells in the first cell set and obtained from the at least one UE in the first cell meets a signal strength comparison relationship of corresponding cells in the first cell set in the first mobility management unit, it may be determined that the UE exists in the first mobility management unit.

It should be noted that, the foregoing is only exemplary, and this embodiment is not limited thereto.

Step 102: Determine radio network information of the first mobility management unit according to measurement statistic information that is of the UE in the first mobility management unit and determined in step 101, where the radio network information may include at least one type of the following information: signal strength information of the first cell in the first mobility management unit, signal strength information of at least one neighboring cell of the first cell in the first mobility management unit, or a statistic value of at least one key performance indicator KPI in the first mobility management unit.

Because it is determined in step 101 that the UE exists in the first mobility management unit, the radio network information of the first mobility management unit may be determined according to the measurement statistic information of the UE in the first mobility management unit, where the measurement statistic information of the UE may include at least one of the following: the measurement report of the UE, performance statistic information, or the like.

The signal strength information of the first cell or a neighboring cell of the first cell in the first mobility management unit may be a measurement statistic value of the signal strength of the first cell or the neighboring cell of the first cell in the first mobility management unit, or a signal strength range of the first cell or the neighboring cell of the first cell in the first mobility management unit.

For example, statistics may be collected for the measurement report of the UE in the first mobility management unit, to determine the signal strength information of the first cell in the first mobility management unit or the signal strength information of at least one neighboring cell of the first cell in the first mobility management unit. When multiple signal strength measurement values for a same cell exist in the measurement report of the UE in the first mobility management unit, the multiple signal strength measurement values may be filtered to obtain one value as a measurement statistic value of signal strength of the same cell in the first mobility management unit. It should be noted that, filtering processing may include mean filtering processing and a filtering processing. A person of ordinary skill in the art may understand that the filtering processing is consistent with that in the prior art and details are not described in detail in the present invention. The signal strength range of the same cell in the first mobility management unit may also be determined according to the multiple signal strength measurement values for the same cell.

For another example, various types of KPIs in the first mobility management unit may be obtained by collecting statistics for the UE in the first mobility management unit within a statistic time, where the KPI may be at least one of the following: for example, a call drop rate, channel usage, a handover success rate, or an access success rate.

For example, Table 1 shows radio network information of the first mobility management unit in the UMTS cell Cell 1, where the information includes signal strength information of the UMTS cell Cell 1 and multiple neighboring cells of the Cell 1, and three types of KPIs. For example, among UMTS cell Cell 1 to Cell 8, Cell 2 to Cell 8 are intra-RAT neighboring cells of the Cell 1, which may be intra-frequency neighboring cells or inter-frequency neighboring cells, and signal strength RSCP 1 is signal strength of the Cell 1, RSCP 2 is signal strength of the Cell 2; likewise, RSCP 8 is signal strength of the Cell 8. GSM cell Cell 9 to Cell 11 are first inter-RAT neighboring cells of the Cell 1, RxLev 1 is signal strength of the Cell 9, RxLev 2 is signal strength of the Cell 10; likewise, RxLev 3 is signal strength of the Cell 11. LTE cells Cell 12 to Cell 15 are second inter-RAT neighboring cells of the Cell 1, RSRQ 1 is signal strength of the Cell 12, RSRQ 2 is signal strength of the Cell 13; likewise, RSRQ 4 is signal strength of the Cell 15. It should be noted that, a neighboring cell that is of each standard and needs to be included in the radio network information may be determined as required. Signal strength of cells of different standards may be represented in another manner. For example, for a UMTS cell, RSCP, Ec/No, or RSCP and EC/No may be used; for an LTE cell, RSRP, RSRQ, or RSRP and RSRQ may be used, which are only exemplary herein, and this embodiment of the present invention is not limited thereto. The three types of KPIs include a call drop rate, channel usage, and a handover success rate.

management unit may be that the second mobility management unit is smaller than the first mobility management unit and located within the first mobility management unit, or the second mobility management unit is the same as the first mobility management unit. The second mobility management unit may be obtained by dividing the second cell in multiple manners, and the second mobility management unit has an area feature of the covered area. For example, the second mobility management unit may be an area obtained by dividing the second cell according to geographical location information of the second cell; or the second mobility management unit may be an area obtained by dividing the second cell according to a signal strength feature of a cell in a second cell set. For a dividing manner, refer to the description of the manner in which the first mobility management unit is obtained by dividing the first cell in step 101, and details are not described herein again.

That the first mobility management unit includes a second mobility management unit may be determined in multiple manners.

For example, the first mobility management unit is obtained by dividing the first cell according to the geographical location information of the first cell, and the second mobility management unit is obtained by dividing the second cell according to the geographical location infor-

TABLE 1

| | Radio network information of the first mobility management unit | | | | | |
|---|---|---|---|---|---|---|
| | Signal strength information | | | | | |
| | UMTS | GSM | LTE | KPI | | |
| First mobility management unit | Cell1 ... Cell8 RSCP1 ... RSCP8 | Cell9 ... Cell11 RxLev1 ... RxLev3 | Cell12 ... Cell15 RSRQ1 ... RSRQ4 | Call drop rate | Channel usage | Handover success rate |

It should be noted that, what is listed in the foregoing embodiments is only exemplary, and the present invention is not limited thereto. Table 1 is also only exemplary, and the present invention is not limited thereto.

In an actual application, after determined once, the radio network information of the first mobility management unit may be subsequently reused or updated according to an actual situation.

By using the method in this embodiment, a granularity of acquiring and managing radio network information in a cell is per mobility management unit, and for a complex cell coverage environment, difference about neighboring cells between different areas of the cell and difference about interference between different areas of the cell can be well specified.

Further, to comprehensively acquire information about multiple communications networks, the method may further include the following optional steps.

Step 103: Determine that the first mobility management unit includes a second mobility management unit, where the second mobility management unit is an area obtained by dividing a second cell; and the second cell and the first cell may be cells that belong to the same system, or cells that belong to different systems. For example, the first cell is a GSM cell 1 and the second cell is a UMTS cell 1, or the first cell is an LTE cell 1 and the second cell is an LTE cell 2.

A coverage area of the second mobility management unit may be less than or equal to that of the second cell. That the first mobility management unit includes a second mobility mation of the second cell. If the geographical range of the first mobility management unit includes a geographical range of the second mobility management unit, it is determined that the first mobility management unit includes the second mobility management unit. For example, the geographical range of the first mobility management unit is a longitude sub-interval (116.12345° to 116.12545°) and a latitude sub-interval (90.12346° to 90.12846°); the geographical range of the second mobility management unit is a longitude sub-interval (116.12345° to 116.12545°) and a latitude interval (90.12346° to 90.12846°). That is, the longitude sub-interval in the geographical range of the first mobility management unit is greater than or equal to the longitude sub-interval of the second mobility management unit, and the latitude sub-interval in the geographical range of the first mobility management unit is greater than or equal to the latitude sub-interval of the second mobility management unit. Therefore, it may be determined that the first mobility management unit includes the second mobility management unit.

For another example, the first mobility management unit is the area obtained by dividing the first cell according to the signal strength feature of the cell in the first cell set. That the first mobility management unit includes a second mobility management unit may be determined according to signal strength information of the cell in the first cell set in the second mobility management unit, where the signal strength information of the cell in the first cell set in the second mobility management unit may be acquired from radio network information of the second mobility management unit.

For example, the first cell is a UMTS cell 1, and signal strength features of cells in the first cell set in the first mobility management unit are (UMTS cell 1, RSCP: −100 dBm to −90 dBm), (UMTS cell 2, RSCP: −105 dBm to −98 dBm), (UMTS cell 3, RSCP: −107 dBm to −92 dBm). The second cell is a UMTS cell 5, and signal strength information of cells that is in the radio network information of the second mobility management unit is (UMTS cell 1, RSCP=−95 dBm), (UMTS cell 2, RSCP=−100 dBm), (UMTS cell 3, RSCP=−105 dBm). It can be learned that, the signal strength information of the cells in the first cell set in the second mobility management unit may be acquired from the radio network information of the second mobility management unit, and the signal strength information of the cells are all within the signal strength ranges of corresponding cells in the first cell set in the first mobility management unit. Therefore, it may be determined that the first mobility management unit includes the second mobility management unit.

It should be noted that, the foregoing is only exemplary, and this embodiment of the present invention is not limited thereto.

Step 104: Combine radio network information of the second mobility management unit with the radio network information of the first mobility management unit.

The radio network information of the second mobility management unit may be determined in the manner in steps 101 to 102, or may be determined in the manner in steps 101 to 104.

The radio network information of the second mobility management unit may be combined with the radio network information of the first mobility management unit in multiple manners. For example, the radio network information of the second mobility management unit may be added to the radio network information of the first mobility management unit. If both the radio network information of the first mobility management unit and the radio network information of the second mobility management unit include signal strength information of a same cell, and if the signal strength information of the cell is a measurement statistic value, signal strength information of the cell in the first mobility management unit and signal strength information of the cell in the second mobility management unit may be filtered to obtain combined signal strength information of the cell in the first mobility management unit. It should be noted that, filtering processing may include mean filtering processing and a filtering processing. A person of ordinary skill in the art may understand that the filtering processing is consistent with that in the prior art, and details are not introduced in the present invention again. If the signal strength information of the cell is a signal strength range, a combined signal strength range may be obtained by using a union set of a signal strength range of the cell in the first mobility management unit and a signal strength range of the cell in the second mobility management unit.

For example, a first mobility management unit in the first cell, the UMTS cell 1, includes a second mobility management unit in the second cell, the UMTS cell 2. Radio network information of the first mobility management unit includes: (GSM cell 1, RxLev=45), (UMTS cell 3, RSCP=−97 dBm), and (UMTS cell 1, call drop rate=0.05%). Radio network information of the second mobility management unit includes: (GSM cell 2, RxLev=25), (LTE cell 1, RSRP=−100 dBm), (UMTS cell 2, call drop rate=0.01%), and (UMTS cell 2, handover success rate=99.8%). Therefore, radio network information of the first mobility management unit obtained by combining the radio network information of the second mobility management unit with the radio network information of the first mobility management unit is: (GSM cell 1, RxLev=45), (GSM cell 2, RxLev=25), (UMTS cell 3, RSCP=−97 dBm), (LTE cell 1, RSRP=−100 dBm), (UMTS cell 1, call drop rate=0.05%), (UMTS cell 2, call drop rate=0.01%), and (UMTS cell 2, handover success rate=99.8%). It should be noted that, the foregoing is only exemplary, and this embodiment is not limited thereto.

In the method in this embodiment, radio network information determined for a same area in various standards is combined into one mobility management unit for unified management, so that radio network information of the mobility management unit can be more complete when the mobility management unit is covered by communications networks of multiple standards at the same time.

Further, on the basis of step 102 or step 104, the method may further include the following optional step.

Step 105: Execute radio resource management according to the radio network information of the first mobility management unit.

In an embodiment, the radio network information of the first mobility management unit may be determined by using steps 101 to 102, or may be determined by using steps 101 to 104.

The radio network information of the first mobility management unit includes at least one type of the following information: the signal strength information of the first cell, the signal strength information of at least one neighboring cell of the first cell, or the statistic value of at least one key performance indicator KPI. Therefore, the radio resource management may be executed according to the radio network information of the first mobility management unit.

The radio resource management includes controlling the UE in the first mobility management unit to complete access or handover in the first cell or in a neighboring cell of the first cell, where the neighboring cell of the first cell and the first cell may be cells that belong to the same system, or cells that belong to different systems.

For example, resource congestion occurs in the first cell. When the UE gains access to the first cell, if it is determined that the UE is located in the first mobility management unit, for a method for determining that the UE is located in the first mobility management unit, refer to the description in step 101 and details are not described herein again. If the radio network information of the first mobility management unit includes the signal strength information of at least one neighboring cell of the first cell, the UE may be controlled, according to the signal strength information of the at least one neighboring cell of the first cell, for example, a third cell as a neighboring cell of the first cell, to gain access to a cell with better signal strength between the first cell and the third cell.

For another example, the first cell is the UMTS cell 1, and the UE has gained access to the UMTS cell 1 and initiated a data service. If it is determined that the UE is located in the first mobility management unit, for a method for determining that the UE is located in the first mobility management unit, refer to the description in step 101 and details are not described herein again. If a call drop rate indicator of the first mobility management unit is higher than a preset threshold, and the radio network information of the first mobility management unit includes KPIs of neighboring cells of the first cell: KPIs of the LTE cell 1 and a wireless fidelity (WIFI) cell 2, and if channel usage of the LTE cell 1 is high and load of the WIFI cell 2 is low, the UE may be controlled to gain access to the WIFI cell 2. If the channel usage of the LTE cell 1 is low and a currently preset radio resource management rule is a cellular network first, the UE may be controlled to perform handover to the LTE cell 1.

It should be noted that, the foregoing is only exemplary, and this embodiment is not limited thereto.

By using the method in this embodiment, radio resource management is performed according to radio network information of a mobility management unit in which a UE is located, and there is no need to wait for a measurement result of the UE on a neighboring cell, thereby reducing latency of access or handover, preventing an incorrect judgment caused by incomplete measurement information of the UE resulting from a difference in different areas of a cell, and enhancing user experience.

It should be noted that the foregoing method may be implemented by using multiple types of network devices, for example, may be implemented by using a base station device such as an RNC, a BSC, an eNodeB, or an AC, or may be implemented by using a centralized control device. A difference lies in that when the centralized control device is used for implementation, the centralized control device is connected to at least one of the foregoing base station devices, and the base station devices transfer, to the centralized control device, preset information of each cell, a measurement report of the UE in the cell, and statistic information.

Figure 2:
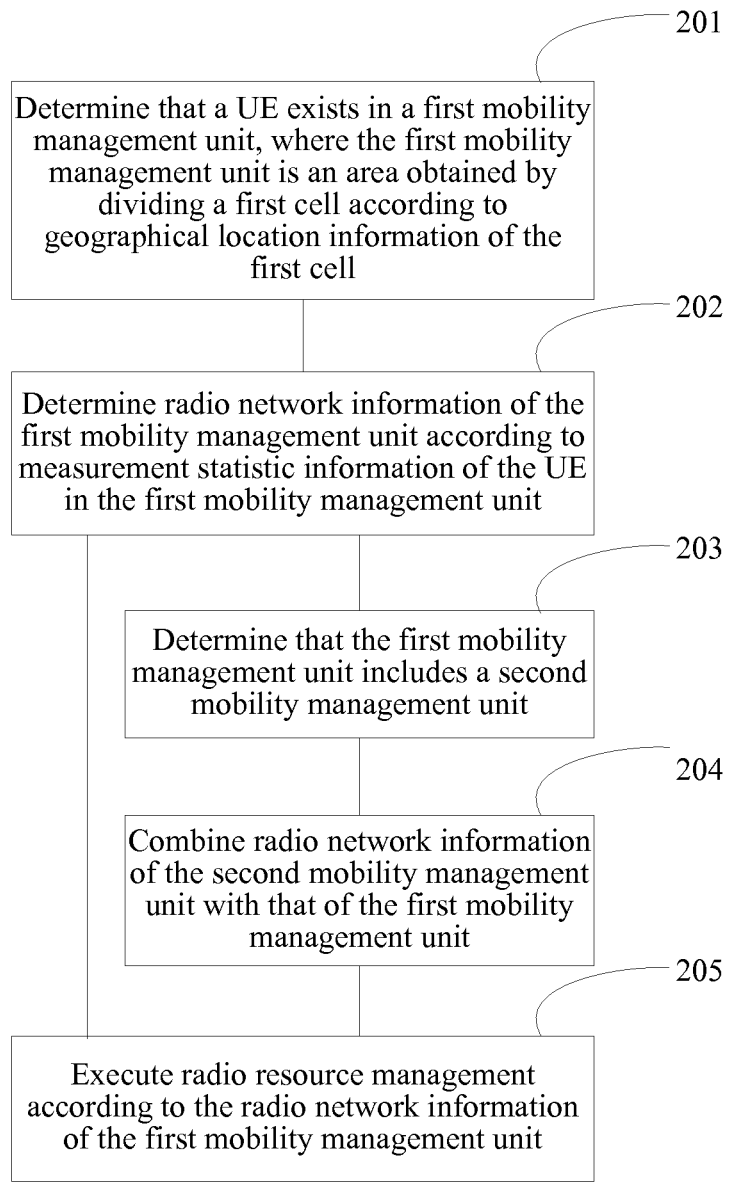
FIG. 2 is a flowchart of a network information management method according to another embodiment.

FIG. 2 is a flowchart of a network information management method according to another embodiment. In this embodiment, a first mobility management unit is an area obtained by dividing a first cell according to geographical location information of the first cell. As shown in FIG. 2, the method may include the following steps.

Step 201: Determine that a UE exists in a first mobility management unit, where the first mobility management unit is an area obtained by dividing a first cell according to geographical location information of the first cell.

The first cell may be a cell in a communications system of any standard, for example, a GSM system, a UMTS system, or an LTE system.

Figure 3:
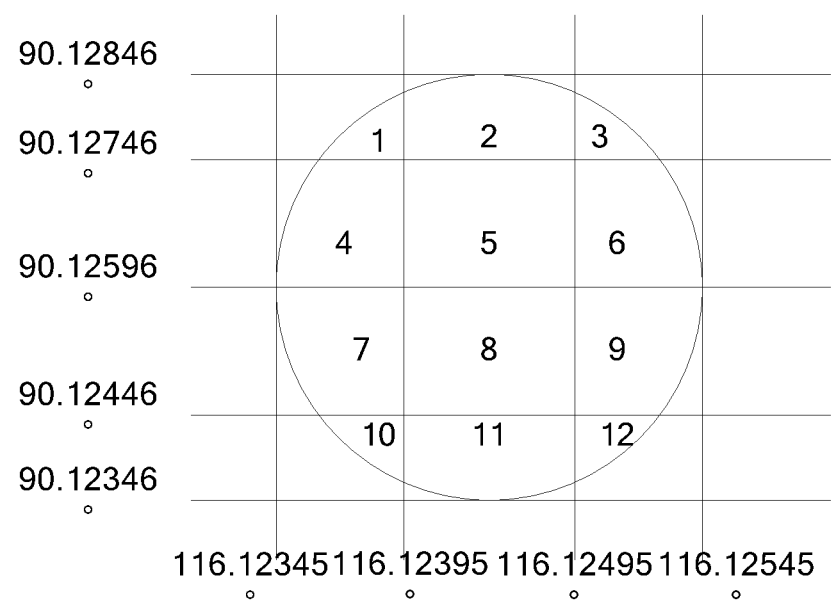
FIG. 3 is a schematic diagram of a mobility management unit obtained by dividing according to geographical location information of a first cell according to another embodiment.

For example, the geographical location information of the first cell may be a longitude interval and a latitude interval that are of the first cell. At least one longitude sub-interval and at least one latitude sub-interval are obtained by dividing the longitude interval and the latitude interval of the first cell. A geographical range of the first mobility management unit may be determined by one of the longitude sub-intervals and one of the latitude sub-intervals. As shown in FIG. 3, the longitude interval of the first cell is (116.12345° to 116.12545°) and the latitude interval is (90.12346° to 90.12846°), and the first cell is divided into 12 mobility management units 1 to 12. A longitude sub-interval of a mobility management unit 1 is (116.12345° to 116.12395°) and a latitude sub-interval of the mobility management unit 1 is (90.12746° to 90.12846°). A longitude sub-interval of a mobility management unit 5 is (116.12395° to 116.12495°) and a latitude sub-interval of the mobility management unit 5 is (90.12596° to 90.12746°). It is noteworthy that, 0.001° represents a straight-line distance of 100 m. The first mobility management unit is the mobility management unit 1, and the geographical range of the first mobility management unit is determined by the longitude sub-interval (116.12345° to 116.12395°) and the latitude sub-interval (90.12746° to 90.12846°). Sizes of longitude sub-intervals or sizes of latitude sub-intervals of all the mobility management units are not necessarily the same. It should be noted that, the number of mobility management units that are obtained by dividing the first cell is determined according to an actual application scenario, which is not limited in the present invention. In addition, increasing the number of mobility management units may improve accuracy of network information management. It may be understood that, the geographical location information may be determined in another manner, for example, determined by using a distance interval relative to a reference point, and this embodiment of the present invention is not limited thereto.

The geographical location information of the first cell may be obtained by acquiring preset information. For example, preset geographical location information of the first cell includes the longitude interval and the latitude interval of the first cell; therefore, the first cell may be divided into mobility management units once and for all, and a result of this dividing may be subsequently reused. Alternatively, the geographical location information of the first cell may be determined according to a longitude and a latitude of the first cell and location information of at least one UE in the first cell. For example, a radius of the first cell is determined according to location information, such as an arrival time or transmit power, measured by the UE in the first cell, and a geographical range of a coverage area of the first cell, such as a longitude interval and a latitude interval, is obtained according to the longitude, the latitude, and the radius of the first cell. After determined once, the longitude interval and the latitude interval that are of the first cell may be updated according to location information subsequently reported by the UE in the first cell. Therefore, after the first cell is divided into mobility management units, a result of this dividing may be subsequently reused or updated according to an actual situation.

For the first mobility management unit obtained by dividing the first cell according to the geographical location information of the first cell, if a geographical location in which the UE in the first cell is located is within the geographical range of the first mobility management unit, it may be determined that the UE exists in the first mobility management unit. For details, refer to the description in step 101 in the foregoing method embodiment, and details are not described herein again.

Step 202: Determine radio network information of the first mobility management unit according to measurement statistic information that is of the UE in the first mobility management unit and determined in step 201, where the radio network information includes at least one type of the following information: signal strength information of the first cell in the first mobility management unit, signal strength information of at least one neighboring cell of the first cell in the first mobility management unit, or a statistic value of at least one key performance indicator KPI in the first mobility management unit.

Because it is determined in step 201 that the UE exists in the first mobility management unit, the radio network information of the first mobility management unit may be determined according to the measurement statistic information of the UE in the first mobility management unit. Reference may be made to the description in the corresponding step 102 in the foregoing method embodiment, and details are not described herein again.

In an actual application, after determined once, the radio network information of the first mobility management unit may be subsequently reused or updated according to an actual situation.

By using the method in this embodiment of the present invention, a granularity of acquiring and managing radio network information in a cell is per mobility management unit, and therefore, difference about neighboring cells between different areas of the cell and difference about interference between different areas of the cell may be well specified.

Further, to comprehensively acquire information about multiple communications networks, the method may further include the following optional steps.

Step 203: Determine that the first mobility management unit includes a second mobility management unit, where the second mobility management unit is an area obtained by dividing a second cell; and the second cell and the first cell may be cells that belong to the same system, or cells that belong to different systems.

A coverage area of the second mobility management unit is less than or equal to that of the second cell. That the first mobility management unit includes a second mobility management unit may be that the second mobility management unit is smaller than the first mobility management unit and located within the first mobility management unit, or the second mobility management unit is the same as the first mobility management unit. The second mobility management unit may be obtained by dividing the second cell in multiple manners. Reference may be made to the description of the manner in which the first mobility management unit is obtained by dividing the first cell in step 101. The second mobility management unit has an area feature of the covered area. For example, the second mobility management unit may be an area obtained by dividing the second cell according to geographical location information of the second cell. If the geographical range of the first mobility management unit includes a geographical range of the second mobility management unit, it is determined that the first mobility management unit includes the second mobility management unit. This has been described in the corresponding step 103 in the foregoing method embodiment, so details are not described herein again.

Step 204: Combine radio network information of the second mobility management unit with the radio network information of the first mobility management unit.

The radio network information of the second mobility management unit may be determined in the manner in steps 201 to 202, or may be determined in the manner in steps 201 to 204.

The radio network information of the second mobility management unit may be combined with the radio network information of the first mobility management unit in multiple manners. Reference may be made to the description in the corresponding step 104 in the foregoing method embodiment, and details are not described herein again.

In the method in this embodiment, radio network information determined for a same area in various standards is combined into one mobility management unit for unified management, so that radio network information of mobility management units can be more complete when communications networks of multiple standards are all covered.

Further, on the basis of step 202 or step 204, the method may further include the following optional step.

Step 205: Execute radio resource management according to the radio network information of the first mobility management unit.

Reference may be made to the description in step 105 in the foregoing method embodiment, and details are not described herein again.

By using the method in this embodiment, radio resource management is performed according to radio network information of a mobility management unit in which a UE is located, and there is no need to wait for a measurement result of the UE on a neighboring cell, thereby reducing latency of access or handover, preventing an incorrect judgment caused by incomplete measurement information of the UE resulting from a difference in different areas of a cell, and enhancing user experience.

Figure 4:
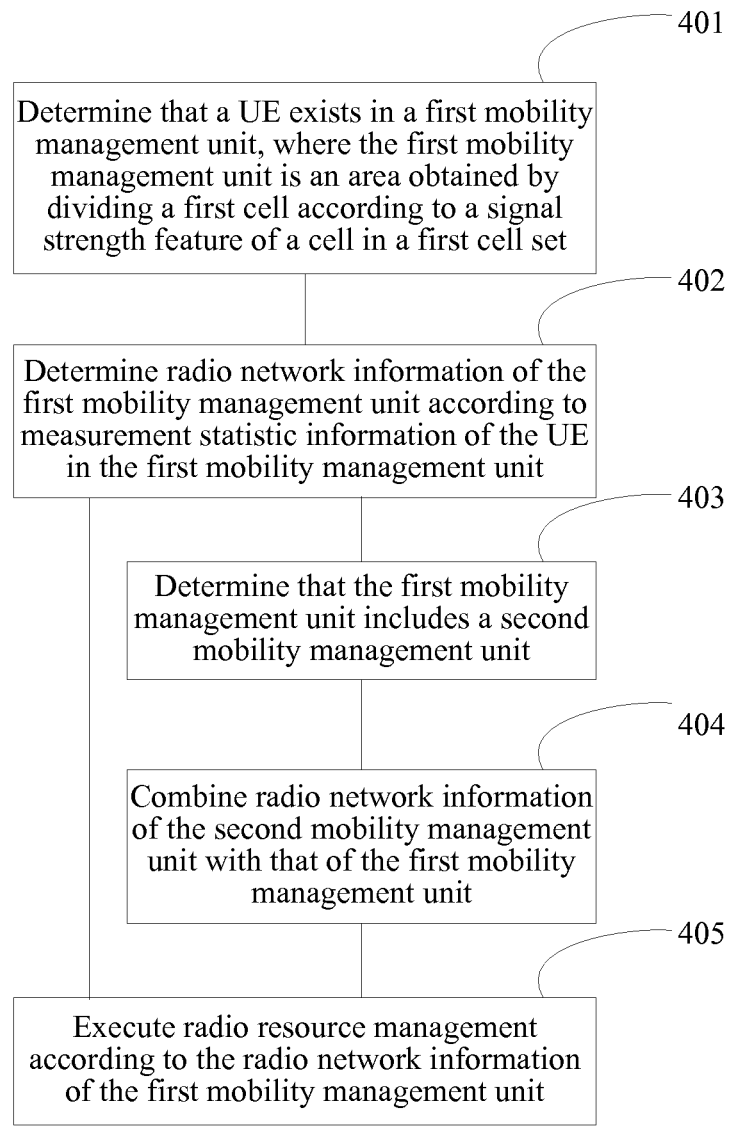
FIG. 4 is a flowchart of a network information management method according to another embodiment.

FIG. 4 is a flowchart of a network information management method according to another embodiment. In this embodiment, a first mobility management unit is an area obtained by dividing a first cell according to a signal strength feature of a cell in a first cell set. As shown in FIG. 4, the method may include the following steps.

Step 401: Determine that a UE exists in a first mobility management unit, where the first mobility management unit is an area obtained by dividing a first cell according to a signal strength feature of a cell in a first cell set.

The first cell may be a cell in a communications system of any standard, for example, a GSM system, a UMTS system, or an LTE system.

The cell included in the first cell set may be determined as required, and the first cell set includes at least the first cell. The first cell set may also include the first cell and at least one neighboring cell of the first cell. The neighboring cell herein may include at least one type of the following neighboring cells: an intra-RAT intra-frequency neighboring cell of the first cell, an intra-RAT inter-frequency neighboring cell of the first cell, or an inter-RAT neighboring cell of the first cell.

If the first cell set includes only the first cell, an entire area that is formed by locations of same signal strength measured by the UE in the first cell may be an annular area whose center is the center of the first cell. The entire area that is formed by the locations of the same signal strength and obtained by dividing the first cell may be used as the first mobility management unit. If the first cell set includes the first cell and at least one neighboring cell of the first cell, the UE may measure signal strength of cells in the first cell set in different locations of the first cell. An entire area that is formed by locations of same signal strength in each measured cell separately forms an annular area whose center is the center of each measured cell, and an area included in an intersection set of these areas may be determined as the first mobility management unit.

Because the UE may measure different neighboring cells in different areas of the first cell, different mobility management units may be obtained by dividing the first cell according to a signal strength feature of a cell in a same cell set, or may be obtained by dividing the first cell according to signal strength features of cells in different cell sets. The different cell sets each include different neighboring cells of the first cell.

Figure 5:
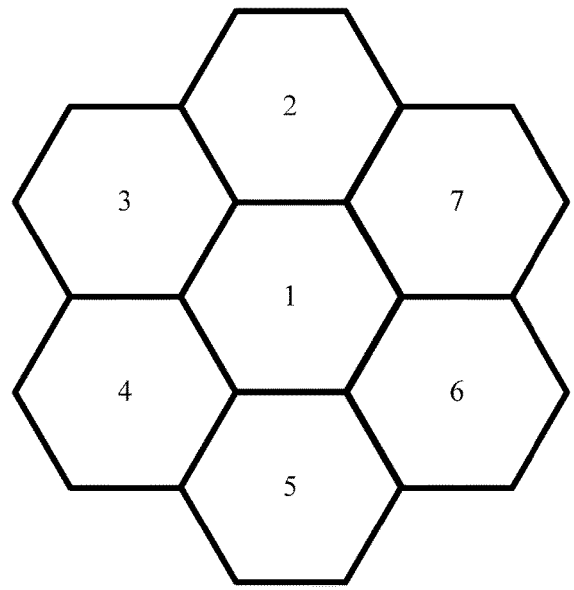
FIG. 5 is a schematic diagram of a first cell set according to another embodiment.

Using FIG. 5 as an example, the first cell is a UMTS cell 1, and intra-frequency neighboring cells of the cell 1 are UMTS cells 2 to 7. The cell 1 may be used as a cell set, that is, in this case, the cell set may include only one cell, that is, the cell 1. The cell 1 and one intra-frequency neighboring cell may also be used as a cell set, for example, cell sets are (1, 2), (1, 3), (1, 4), (1, 5), (1, 6), and (1, 7) respectively, and the first cell set is (1, 2). The cell 1 and two intra-frequency neighboring cells may also be used as a cell set, for example, cell sets are (1, 2, 3), (1, 3, 4), (1, 4, 5), (1, 5, 6), (1, 6, 7), and (1, 7, 2) respectively, and the first cell set is (1, 2, 3). It should be noted that, the number of intra-frequency neighboring cells or intra-RAT neighboring cells included in each cell set is determined according to an actual application scenario, and the determined number of cell sets is also determined as required. The foregoing is only exemplary, and the present invention is not limited thereto.

To reduce impact on network interference enhancement or performance deterioration caused by measurement of the UE on an inter-frequency neighboring cell or an inter-RAT neighboring cell, an intra-frequency neighboring cell of the first cell or an intra-RAT neighboring cell of the first cell may be selected as the cell set. For example, when the first cell is a GSM cell, the neighboring cell included in the first cell set is a neighboring GSM cell 1. For another example, when the first cell is a UMTS cell, the neighboring cell included in the first cell set is a UMTS infra-frequency neighboring cell 1 and a UMTS intra-frequency neighboring cell 2. It should be noted that, the foregoing is only exemplary, and this embodiment is not limited thereto.

The first mobility management unit may be the area obtained by dividing the first cell according to the signal strength feature of the cell in the first cell set.

The signal strength feature of the cell in the first cell set includes at least one of the following: a signal strength range of the cell in the first cell set, or a signal strength comparison relationship of cells in the first cell set. It is not listed herein, and this embodiment of the present invention is not limited thereto.

For cells of different standards, signal strength may be represented in different manners. For example, for a GSM cell, signal strength is represented by a received signal level (RxLev); for a UMTS cell, signal strength may be represented by received signal code power (RSCP) with a unit of dBm, or may be represented by a ratio of energy per chip to the total received power density (Echo) with a unit of dB; for an LTE cell, signal strength may be represented by reference signal received power (RSRP) with a unit of dBm, or may be represented by reference signal received quality (RSRQ) with a unit of dB. It is not listed herein, and this embodiment of the present invention is not limited thereto.

In an embodiment, a first mobility management unit is an area obtained by dividing a first cell according to a signal strength range of a cell in a first cell set. For example, the first cell set includes the first cell and two intra-frequency neighboring cells 1 and 2 of the first cell. A signal strength range of the first cell is divided into 5 sub-intervals; a signal strength range of the intra-frequency neighboring cell 1 is divided into 2 sub-intervals; a signal strength range of the intra-frequency neighboring cell 2 is divided into 3 sub-intervals. The first cell may be divided into a maximum of 5×2×3 areas according to signal strength information of a cell in the first cell set. As required, all or some of the areas may be selected as mobility management units in the first cell, on which network information management needs to be performed. For example, 10 areas are selected as 10 mobility management units of the first cell for performing network information management, and one is used as the first mobility management unit. It should be noted that, the foregoing is only exemplary, and this embodiment of the present invention is not limited thereto.

Figure 6:
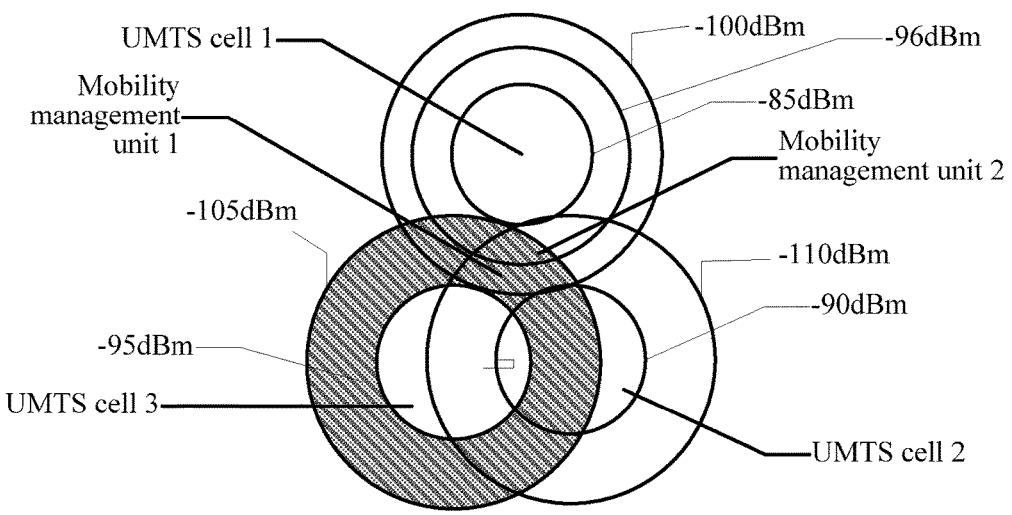
FIG. 6 is a schematic diagram of a mobility management unit obtained by dividing according to signal strength information of cells in a first cell set according to another embodiment.

For example, as shown in FIG. 6, the first cell is the UMTS cell 1; the intra-frequency neighboring cells are UMTS cells 2 and 3; the first cell set is UMTS cells 1 to 3. Signal strength used herein is RSCP. It should be noted that different signal strength representation manners may be used for cells of different standards, which is not limited herein. An RSCP range of the UMTS cell 1 is (−100 dBm to −85 dBm); an RSCP range of the UMTS cell 2 is (−110 dBm to −90 dBm); an RSCP range of the UMTS cell 3 is (−105 dBm to −95 dBm). The RSCP range of the UMTS cell 1 may be divided into two sub-intervals (−100 dBm to −96 dBm) and (−95 dBm to −85 dBm); the RSCP range of the UMTS cell 2 is divided into only one sub-interval (−110 dBm to −90 dBm); and the RSCP range of the UMTS cell 3 is divided into only one sub-interval (−105 dBm to −95 dBm). An area in which an RSCP of the UMTS cell 1 is (−100 dBm to −96 dBm), an RSCP of the UMTS cell 2 is (−110 dBm to −90 dBm), and an RSCP of the UMTS cell 3 is (−105 dBm to −95 dBm) is used as a mobility management unit 1 of the UMTS cell 1. An area in which an RSCP of the UMTS cell 1 is (−95 dBm to −85 dBm), an RSCP of the UMTS cell 2 is (−110 dBm to −90 dBm), and an RSCP of the UMTS cell 3 is (−105 dBm to −95 dBm) is used as a mobility management unit 2 of the UMTS cell 1. The mobility management unit 1 is used as a first mobility management unit. In this embodiment, it is illustrated that the first mobility management unit is obtained by dividing according to signal strength features of cells in the first cell set (UMTS cell 1, UMTS cell 2, UMTS cell 3). It is not listed herein, and this embodiment is not limited thereto.

In another embodiment, a first mobility management unit is an area obtained by dividing a first cell according to a signal strength range of the first cell in a first cell set and a signal strength comparison relationship between neighboring cells of the first cell.

Figure 7:
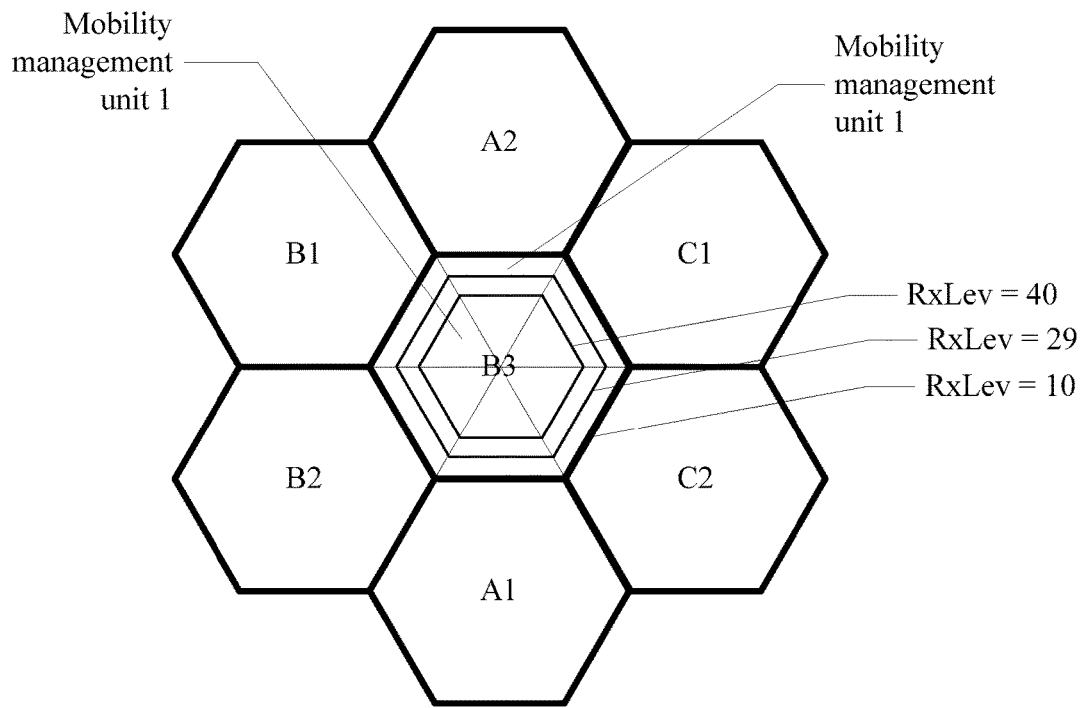
FIG. 7 is a schematic diagram of a mobility management unit obtained by dividing according to signal strength information of cells in a first cell set according to another embodiment.

For example, as shown in FIG. 7, the first cell is a GSM cell B3, and neighboring cells of the first cell are GSM cells A1, A2, B1, B2, C1, and C2. Signal strength of a neighboring GSM cell may be represented by an RxLev. A signal strength range of the B3 is (10 to 63) and is divided into 3 sub-intervals (10 to 29), (30 to 39), and (40 to 63). For a first cell set (B3, B1, A2, C1), the first mobility management unit is an area in which an RxLev of the B3 is (10 to 29), an RxLev of the A2 is higher than or equal to an RxLev of the B1, and an RxLev of the A2 is higher than or equal to an RxLev of the C1, which is the mobility management unit 1 in FIG. 6. For another cell set (B3, A2, B1, B2), an area in which an RxLev of the B3 is (40 to 63), an RxLev of the B1 is higher than or equal to an RxLev of the A2, and an RxLev of the B1 is higher than or equal to an RxLev of the B2 may be used as a mobility management unit 2 of the B3. Likewise, the first cell may be divided into multiple mobility management units according to the signal strength comparison relationship of neighboring cells in different cell sets and the signal strength range of the first cell, which is not listed herein, and this embodiment of the present invention is not limited thereto.

The signal strength feature of the cell in the first cell set may be obtained in multiple manners. For example, when the signal strength feature of the cell in the first cell set includes a signal strength range of the cell in the first cell set, a valid value range of signal strength of a standard corresponding to the cell may be used as the signal strength range of the cell. For example, an RSCP valid value of the UMTS cell is (−115 dBm to −25 dBm), and a valid RxLev value of the GSM cell is (0 to 63). It is not listed herein, and this embodiment of the present invention is not limited thereto. Therefore, the first cell may be divided into mobility management units once and for all, and a result of this dividing may be subsequently reused.

In another embodiment, a signal strength range of a cell in a first cell set may also be determined by acquiring in advance signal strength of the cell in a measurement report of at least one UE in the first cell. After determined once, the signal strength range may be updated according to measurement reports subsequently reported by the UE in the first cell. Therefore, after the first cell is divided into mobility management units, a result of this dividing may be subsequently reused or updated according to an actual situation. If signal strength of a cell in the cell set cannot be determined by using a measurement report of any UE in the first cell, for example, the cell cannot be used as a measured cell in the measurement report of the UE in the first cell, the cell set in which the cell is located cannot be used to obtain mobility management units by dividing the first cell.

Figure 8:
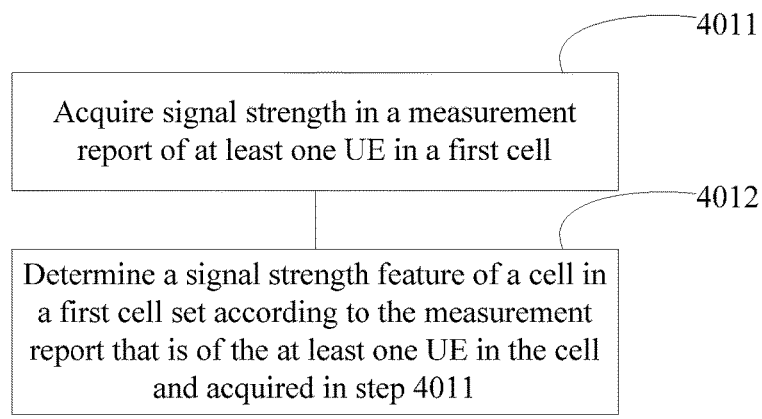
FIG. 8 is a flowchart of a method for determining signal strength information of cells in a first cell set according to another embodiment.

Referring to FIG. 8, FIG. 8 shows a manner of determining in advance a signal strength feature of a cell in a first cell set according to an embodiment of the present invention, where the manner may include the following content.

Step 4011: Acquire signal strength in a measurement report of at least one UE in a first cell.

At least one UE used to collect measurement reports may be selected in the first cell. The number of UEs used to collect measurement reports is determined according to an actual application scenario. A selecting manner may be random selecting or selecting a UE with a low moving speed, which is not limited in the present invention. More UEs in the first mobility management unit that are used to collect measurement reports indicates a more complete and accurate signal strength feature that is of the cell in the first mobility management unit and determined according to measurement information of the UE. Measurement control massages are sent to these UEs, so that these UEs report at least one measurement report within a statistic time. In an embodiment of the present invention, to ensure that the measurement reports steadily reflect measurement information of an area in which the UE is located, a statistic time corresponding to the UE may be selected according to a range of the area and a moving speed of the UE. For example, in an area range of 500 meters, for a UE with a moving speed of 10 m/s, a statistic time of the UE does not exceed 50 s. It should be noted that the foregoing is only exemplary, and this embodiment of the present invention is not limited thereto.

The measurement report of the UE includes a signal strength measurement value of each measured cell, where the measured cell may be at least one of the following: the first cell, an intra-RAT intra-frequency neighboring cell of the first cell, an intra-RAT inter-frequency neighboring cell of the first cell, or an inter-RAT neighboring cell of the first cell. Measured cells included in multiple measurement reports of a same UE may be the same or different. Signal strength measurement values of a same measured cell in multiple measurement reports of a same UE may be the same or different.

For example, two measurement reports of the same UE, respectively a measurement report 1 and a measurement report 2, are received within a statistic time, and an example in which the first cell is the UMTS cell 1 is used.

Measured cells and signal strength measurement values of the cells in the measurement report 1 are: (UMTS cell 1, RSCP=−95 dBm), (UMTS intra-frequency neighboring cell 2, RSCP=−110 dBm), (UMTS intra-frequency neighboring cell 3, RSCP=−100 dBm), (UMTS intra-frequency neighboring cell 4, RSCP=−98 dBm), (UMTS inter-frequency neighboring cell 5, RSCP=−105 dBm), (neighboring GSM cell 1, RxLev=20), (neighboring GSM cell 2, RxLev=10), (LTE neighboring cell 1, RSRP=−130 dBm), and (LTE neighboring cell 2, RSRP=−110 dBm).

Measured cells and signal strength measurement values of the cells in the measurement report 2 are: (UMTS cell 1, RSCP=−100 dBm), (UMTS intra-frequency neighboring cell 3, RSCP=−98 dBm), (UMTS intra-frequency neighboring cell 4, RSCP=−100 dBm), (UMTS inter-frequency neighboring cell 6, RSCP=−108 dBm), (neighboring GSM cell 1, RxLev=20), (LTE neighboring cell 1, RSRP=−130 dBm), and (LTE neighboring cell 3, RSRP=−120 dBm).

The RSCP of the UMTS cell 1 is −95 dBm in the measurement report 1 and −100 dBm in the measurement report 2, and the RxLev of the neighboring GSM cell 1 is 20 in both the measurement report 1 and the measurement report 2, which is not listed herein. It should be noted that, the foregoing is only exemplary, and this embodiment is not limited thereto.

The signal strength of the cell in the first cell set may be acquired by using one measurement report of one UE, or may be acquired by using more than one measurement report of one UE or more than one measurement report of different UEs. To ensure that measured cells in acquired measurement reports include all cells in the first cell set, measurement reports of the UE in the first cell may be collected repeatedly until it is determined that the measured cells in the acquired measurement reports include all the cells in the first cell set.

Step 4012: Determine a signal strength feature of a cell in a first cell set according to the measurement report that is of the at least one UE in the cell and acquired in step 4011.

The determining a signal strength feature of a cell in a first cell set according to the measurement report that is of the at least one UE in the cell and acquired in step 4011 may be implemented in multiple manners.

For example, for the cell in the first cell set, at least one signal strength measurement value of a corresponding cell is obtained from the acquired measurement report of at least one UE. A signal strength range of the corresponding cell may be determined by using a minimum value and a maximum value in the signal strength measurement values of the cell. For example, it may be (the minimum value−α to the maximum value+β), where α and β are preset numeric values that are greater than or equal to 0.

For another example, if the number of signal strength measurement values of a same cell in different measurement reports of a same UE is more than one, filtering processing may be performed on the signal strength measurement values of the cell in the different measurement reports of the same UE to obtain a statistic value of measurement performed by the UE on the signal strength of the cell. It should be noted that, the filtering processing may include mean filtering processing and α filtering processing. A person of ordinary skill in the art may understand that the filtering processing is consistent with that in the prior art, and details are not introduced in the present invention again. If the number of signal strength measurement values of the same cell in the different measurement reports of the same UE is only one, the signal strength measurement value is used as the statistic value of measurement performed by the UE on the signal strength of the cell. Then a signal strength interval of the cell is determined according to the minimum value and the maximum value in statistic values of measurement performed by different UEs on the signal strength of the cell.

For ease of exemplary description, the measurement report 1 and the measurement report 2 of the UE in step 4011 are still used as an example. According to the foregoing method, it may be determined that statistic values of measurement performed by the UE on the signal strength of measured cells are: (UMTS cell 1, RSCP=−98 dBm), (UMTS intra-frequency neighboring cell 2, RSCP=−110 dBm), (UMTS intra-frequency neighboring cell 3, RSCP=−99 dBm), (UMTS intra-frequency neighboring cell 4, RSCP=−99 dBm), (UMTS inter-frequency neighboring cell 5, RSCP=−105 dBm), (UMTS inter-frequency neighboring cell 6, RSCP=−108 dBm), (neighboring GSM cell 1, RxLev=20), (neighboring GSM cell 2, RxLev=10), (LTE neighboring cell 1, RSRP=−130 dBm), (LTE neighboring cell 2, −110 dBm), and (LTE neighboring cell 3, RSCP=−120 dBm). The UMTS cell 1 has RSCP measurement values in both the measurement report 1 and the measurement report 2, and an RSCP statistic result that is of the UMTS cell 1 and obtained by means of filtering is −98 dBm. The UMTS intra-frequency neighboring cell 2 has an RSCP measurement value in the measurement report 1, but does not have a corresponding RSCP measurement value in the measurement report 2. An RSCP measurement statistic value of the UMTS intra-frequency neighboring cell 2 may be the RSCP measurement value of the UMTS intra-frequency neighboring cell 2 in the measurement report 1, that is, RSCP=−110 dBm. RSCP measurement statistic values of other measured cells are not listed. It should be noted that, it is only an exemplary description herein, and this embodiment of the present invention is not limited thereto.

For the first mobility management unit obtained by dividing the first cell according to signal strength information of the cell in the first cell set, it may be determined, according to signal strength that is of the cell in the first cell set and obtained from the UE in the first cell, whether the UE exists in the first mobility management unit.

For example, measured cells with a same type as that of neighboring cells in the first cell set in the measurement report of the UE are sorted in descending order according to signal strength measurement values. If the first N measured cells are the same as all the N neighboring cells in the first cell set, where N is a positive integer and is the number of neighboring cells in the first cell set, it may be determined, according to signal strength of the first cell and the first N measured cells in the measurement report of the UE, whether the UE exists in the first mobility management unit.

For example, using an example in which the first mobility management unit is an area obtained by dividing the UMTS cell 1 according to a signal strength range of the cell in the first cell set, the first cell set includes the UMTS cell 1 and two intra-frequency neighboring cells, and is (UMTS cell 1, UMTS intra-frequency neighboring cell 3, UMTS intra-frequency neighboring cell 4). Signal strength measurement values of measured cells in a measurement report of a UE 1 in the UMTS cell 1 are: (UMTS cell 1, RSCP=−98 dBm), (UMTS intra-frequency neighboring cell 2, RSCP=−110 dBm), (UMTS intra-frequency neighboring cell 3, RSCP=−99 dBm), (UMTS intra-frequency neighboring cell 4, RSCP=−106 dBm), (UMTS inter-frequency neighboring cell 5, RSCP=−105 dBm), (UMTS inter-frequency neighboring cell 6, RSCP=−108 dBm), (neighboring GSM cell 1, RxLev=20), (neighboring GSM cell 2, RxLev=10), (LTE neighboring cell 1, RSRP=−130 dBm), (LTE neighboring cell 2, RSRP=−110 dBm), and (LTE neighboring cell 3, RSRP=−120 dBm). It can be learned that, in the measurement report of the UE 1, the first two UMTS intra-frequency neighboring cells are (UMTS intra-frequency neighboring cell 3, RSCP=−99 dBm) and (UMTS intra-frequency neighboring cell 4, RSCP=−106 dBm), which are the same as the two neighboring cells in the first cell set. The first mobility management unit is an area obtained by dividing according to the signal strength ranges of the cells in the first cell set (UMTS cell 1, UMTS intra-frequency neighboring cell 3, UMTS intra-frequency neighboring cell 4), that is, the first mobility management unit is an area obtained by dividing, in which an RSCP of the UMTS cell 1 is (−100 dBm to −90 dBm), an RSCP of the UMTS intra-frequency neighboring cell 3 is (−105 dBm to −95 dBm), and an RSCP of the UMTS intra-frequency cell 4 is (−110 dBm to −100 dBm). Therefore, it may be determined that the UE exists in the first mobility management unit. It should be noted that, the foregoing is only exemplary, and this embodiment of the present invention is not limited thereto.

For another example, using an example in which the first mobility management unit is an area obtained by dividing the UMTS cell 1 according to a signal strength range of the first cell in the first cell set and a signal strength comparison relationship of neighboring cells of the first cell, the first cell set includes the UMTS cell 1 and three intra-frequency neighboring cells, and is (UMTS cell 1, UMTS intra-frequency neighboring cell 2, UMTS intra-frequency neighboring cell 3, UMTS intra-frequency neighboring cell 4). The first mobility management unit is an area obtained by dividing, in which an RSCP of the UMTS cell 1 is (−100 dBm to −90 dBm), an RSCP of the UMTS intra-frequency neighboring cell 2 is less than or equal to an RSCP of the UMTS intra-frequency neighboring cell 3, and an RSCP of the UMTS intra-frequency neighboring cell 4 is less than or equal to an RSCP of the UMTS intra-frequency neighboring cell 3. In the measurement report of the UE 1, the RSCP of the UMTS cell 1 is −95 dBm, the RSCP of the UMTS intra-frequency neighboring cell 2 is −108 dBm, the RSCP of the UMTS intra-frequency neighboring cell 3 is −100 dBm, and the RSCP of the UMTS intra-frequency neighboring cell 4 is −105 dBm; that is, the RSCP of the UMTS cell 1 is within a range of (−100 dBm to −90 dBm), the RSCP of the UMTS intra-frequency neighboring cell 2 is less than or equal to the RSCP of the UMTS intra-frequency neighboring cell 3, and the RSCP of the UMTS intra-frequency neighboring cell 4 is less than or equal to the RSCP of the UMTS intra-frequency neighboring cell 3. Therefore, it may be determined that the UE exists in the first mobility management unit. It should be noted that, the foregoing is only exemplary, and this embodiment is not limited thereto.

In this step, for at least one UE in the first cell, it may be separately determined according to the foregoing methods that the UE exists in the first mobility management unit. The number of UEs may be determined as required, and this embodiment is not limited thereto.

Step 402: Determine radio network information of the first mobility management unit according to measurement statistic information that is of the UE in the first mobility management unit and determined in step 401, where the radio network information includes at least one type of the following information: signal strength information of the first cell in the first mobility management unit, signal strength information of at least one neighboring cell of the first cell in the first mobility management unit, or a statistic value of at least one key performance indicator KPI in the first mobility management unit.

The radio network information of the first mobility management unit is determined according to the measurement statistic information that is of the UE in the first mobility management unit and determined in step 401. Reference may be made to the description in the corresponding step 102 in the foregoing method embodiment, and details are not described herein again.

In an actual application, after determined once, the radio network information of the first mobility management unit may be subsequently reused or updated according to an actual situation.

By using the method in this embodiment, a granularity of acquiring and managing radio network information in a cell is per mobility management unit, and for a complex cell coverage environment, difference about neighboring cells between different areas of the cell and difference about interference between different areas of the cell can be well specified.

Further, to comprehensively acquire information about multiple communications networks, the method may further include the following optional steps.

Step 403: Determine that the first mobility management unit includes a second mobility management unit, where the second mobility management unit is an area obtained by dividing a second cell; and the second cell and the first cell may be cells that belong to the same system, or cells that belong to different systems.

A coverage area of the second mobility management unit is less than or equal to that of the second cell. That the first mobility management unit includes a second mobility management unit may be that the second mobility management unit is smaller than the first mobility management unit and located within the first mobility management unit, or the second mobility management unit is the same as the first mobility management unit. The second mobility management unit may be obtained by dividing the second cell in multiple manners. Reference may be made to the description of the manner in which the first mobility management unit is obtained by dividing the first cell in step 101. The second mobility management unit has an area feature of the covered area. It may be determined, according to signal strength information of the cell in the first cell set in the second mobility management unit, that the first mobility management unit includes the second mobility management unit, where the signal strength information of the cell in the first cell set in the second mobility management unit may be acquired from radio network information of the second mobility management unit.

Reference may be made to the description in the corresponding step 103 in the foregoing method embodiment, and details are not described herein again.

Step 404: Combine radio network information of the second mobility management unit with the radio network information of the first mobility management unit.

The radio network information of the second mobility management unit may be determined in the manner in steps 401 to 402, or may be determined in the manner in steps 401 to 404.

The radio network information of the second mobility management unit may be combined with the radio network information of the first mobility management unit in multiple manners. Reference may be made to the description in the corresponding step 104 in the foregoing method embodiment, and details are not described herein again.

In the method in this embodiment of the present invention, radio network information determined for a same area in various standards is combined into one mobility management unit for unified management, so that radio network information of mobility management units can be more complete when communications networks of multiple standards are all covered.

Further, on the basis of step 402 or step 404, the method may further include the following optional step:

Step 405: Execute radio resource management according to the radio network information of the first mobility management unit.

Reference may be made to the description in step 105 in the foregoing method embodiment, and details are not described herein again.

By using the method in this embodiment of the present invention, radio resource management is performed according to radio network coverage information of a mobility management unit in which a UE is located, and there is no need to wait for a measurement result of the UE on a neighboring cell, thereby reducing latency of access or handover, preventing an incorrect judgment caused by incomplete measurement information of the UE resulting from a difference in different areas of a cell, and enhancing user experience.

It should be noted that the foregoing method may be implemented by using multiple types of network devices, for example, may be implemented by using a base station device such as an RNC, a BSC, an eNodeB, or an AC, or may be implemented by using a centralized control device. A difference lies in that when the centralized control device is used for implementation, the centralized control device is connected to at least one of the foregoing base station devices, and the base station devices transfer preset information of a cell and measurement information of the UE to the centralized control device.

Figure 9:
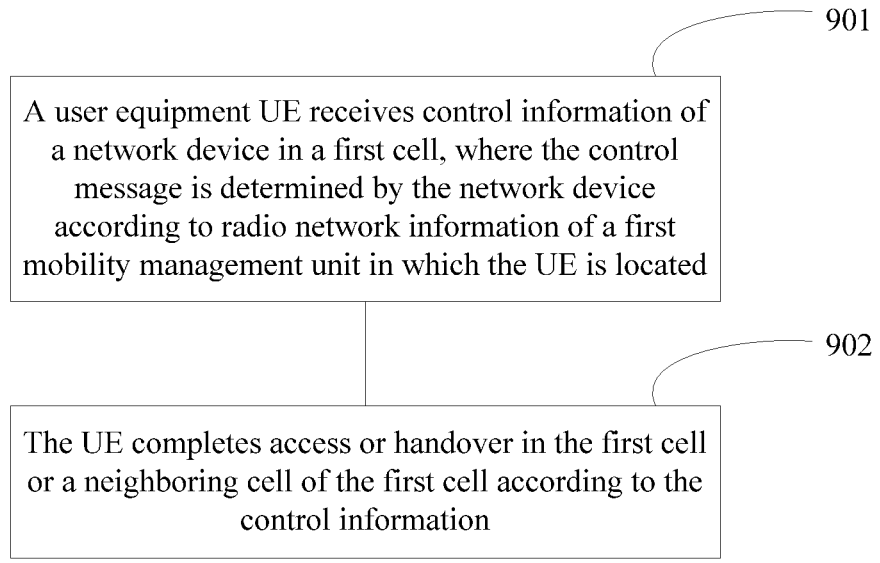
FIG. 9 is a flowchart of a network information management method according to another embodiment.

FIG. 9 shows a network information management method according to another embodiment of the present invention, and the method may be implemented by using a user equipment UE. As shown in FIG. 9, the shown method includes the following steps.

Step 901: A UE receives control information of a network device in a first cell, where the control information is determined by the network device according to radio network information of a first mobility management unit in which the UE is located, the first mobility management unit is an area obtained by dividing the first cell, and the radio network information of the first mobility management unit includes at least one type of the following information: signal strength information of the first cell in the first mobility management unit, signal strength information of at least one neighboring cell of the first cell in the first mobility management unit, or a statistic value of at least one key performance indicator KPI in the first mobility management unit.

The first mobility management unit may be an area obtained by the network device by dividing the first cell according to geographical location information of the first cell. Reference may be made to the description in the corresponding step in the foregoing method embodiment, and details are not described herein again.

The first mobility management unit may also be an area obtained by the network device by dividing according to a signal strength feature of the cell in the first cell set, where the first cell set may include at least the first cell, and may also include the first cell and at least one neighboring cell of the first cell, where the neighboring cell may include at least one type of the following neighboring cells: an intra-RAT intra-frequency neighboring cell of the first cell, an intra-RAT inter-frequency neighboring cell of the first cell, or an inter-RAT neighboring cell of the first cell. The signal strength feature of the cell in the first cell set includes at least one of the following: a signal strength range of the cell in the first cell set, or a signal strength comparison relationship of cells in the first cell set. Reference may be made to the description in the corresponding step in the foregoing method embodiment, and details are not described herein again.

The first mobility management unit in which the UE is located may be determined by the network device by referring to step 102 in the foregoing method embodiment, and details are not described herein again.

The radio network information of the first mobility management unit is determined by the network device according to method steps in the foregoing method embodiment.

Step 902: The UE completes access or handover in the first cell or a neighboring cell of the first cell according to the control information that is received in step 901.

By using the method in this embodiment, a UE does not need to start measurement of a neighboring cell; instead, a network device performs radio resource management directly according to radio network information of a mobility management unit in which the UE is located, thereby reducing latency of access or handover and enhancing user experience.

Figure 10:
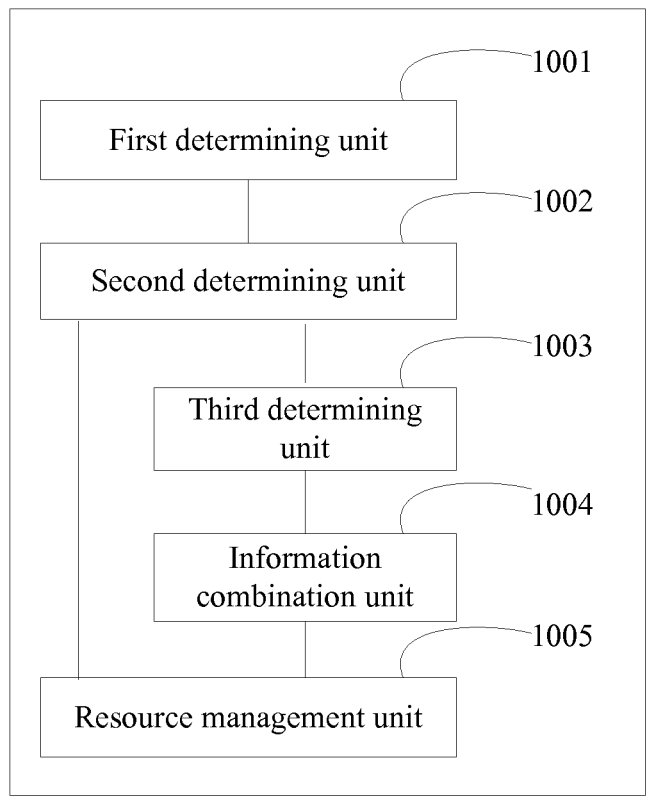
FIG. 10 is a structural diagram of a network device according to another embodiment.

FIG. 10 shows an apparatus structure of a network device according to another embodiment. The network device provided in this embodiment may implement the foregoing method embodiments of the present invention. As shown in FIG. 10, the network device includes: a first determining unit 1001 and a second determining unit 1002.

The first determining unit 1001 is configured to determine that a user equipment UE exists in a first mobility management unit. The first mobility management unit is an area obtained by dividing the first cell. The first cell may be a cell in a communications system of any standard, for example, a GSM system, a UMTS system, or an LTE system.

A coverage area of the first mobility management unit is less than or equal to that of the first cell, and may be used to perform differential mobility management on the UE according to subdivided areas in the first cell.

The first mobility management unit may be obtained by dividing the first cell in multiple manners, and the first mobility management unit has an area feature of the covered area.

For example, the first mobility management unit may be an area obtained by dividing the first cell according to geographical location information of the first cell. In a possible implementation manner, the geographical location information of the first cell may be a longitude interval and a latitude interval. At least one longitude sub-interval and at least one latitude sub-interval are obtained by dividing the longitude interval and the latitude interval of the first cell. A geographical range of the first mobility management unit may be determined by one of the longitude sub-intervals and one of the latitude sub-intervals.

For the first mobility management unit obtained by dividing the first cell according to the geographical location information of the first cell, the first determining unit 1001 is specifically configured to, if a geographical location in which at least one UE in the first cell is located is within the geographical range of the first mobility management unit, determine that the UE exists in the first mobility management unit.

For another example, the first mobility management unit may be an area obtained by dividing the first cell according to a signal strength feature of the cell in the first cell set. The first cell set may include at least the first cell. Certainly, the first cell set may also include the first cell and at least one neighboring cell of the first cell, where the neighboring cell may include at least one type of the following neighboring cells: an intra-RAT intra-frequency neighboring cell of the first cell, an intra-RAT inter-frequency neighboring cell of the first cell, or an inter-RAT neighboring cell of the first cell. The signal strength feature of the cell in the first cell set includes at least one of the following: a signal strength range of the cell in the first cell set, or a signal strength comparison relationship of cells in the first cell set. For example, the first mobility management unit may be an area obtained by dividing the first cell according to the signal strength range of the cell in the first cell set. The signal strength range of the cell is separately divided to obtain a signal strength sub-interval. The signal strength range of the cell in the first cell set in the first mobility management unit is separately determined by a signal strength sub-interval of a corresponding cell. For another example, the first mobility management unit may be an area obtained by dividing the first cell according to the signal strength comparison relationship of cells in the first cell set. For another example, the first mobility management unit may be an area obtained by dividing the first cell according to the signal strength comparison relationship of cells in the first cell set and the signal strength range of the cell in the first cell set. It should be noted that, the foregoing is only exemplary, and this embodiment of the present invention is not limited thereto.

For cells of different standards, signal strength may be represented in different manners. For example, for a GSM cell, signal strength is represented by a received signal level (RxLev); for a UMTS cell, signal strength may be represented by received signal code power (RSCP) with a unit of dBm, or may be represented by a ratio of energy per chip to the total received power density (Echo) with a unit of dB; for an LTE cell, signal strength may be represented by reference signal received power (RSRP) with a unit of dBm, or may be represented by reference signal received quality (RSRQ) with a unit of dB. It is not listed herein, and this embodiment of the present invention is not limited thereto.

For the first mobility management unit obtained by dividing the first cell according to the signal strength feature of the cell in the first cell set, the first determining unit 1001 is specifically configured to determine, according to signal strength that is of the cell in the first cell set and obtained from the UE in the first cell, whether the UE exists in the first mobility management unit.

For example, the first mobility management unit is the area obtained by dividing the first cell according to the signal strength range of the cell in the first cell set. The first determining unit 1001 is specifically configured to, if signal strength that is of the cell in the first cell set and obtained from at least one UE is respectively within a signal strength range of a corresponding cell in the first cell set in the first mobility management unit, determine that the UE exists in the first mobility management unit.

For another example, the first mobility management unit is the area obtained by dividing the first cell according to the signal strength comparison relationship of cells in the first cell set. The first determining unit 1001 is specifically configured to: if a comparison relationship of signal strength that is of cells in the first cell set and obtained from at least one UE meets a signal strength comparison relationship of corresponding cells in the first cell set in the first mobility management unit, determine that the UE exists in the first mobility management unit.

For another example, the first mobility management unit is an area obtained by dividing the first cell according to a signal strength range of the cell in the first cell set and a signal strength comparison relationship of cells in the first cell set. The first determining unit 1001 is specifically configured to: if the signal strength that is of the cell in the first cell set and obtained from at least one UE is respectively within a signal strength range of a corresponding cell in the first cell set in the first mobility management unit, and, the comparison relationship of signal strength that is of cells in the first cell set and obtained from at least one UE meets the signal strength comparison relationship of corresponding cells in the first cell set in the first mobility management unit, determine that the UE exists in the first mobility management unit.

A manner in which the first mobility management unit is obtained by dividing the first cell, and determining that the UE exists in the first mobility management unit have been introduced in the foregoing method embodiments and details are not described herein again.

The second determining unit 1002 is configured to determine radio network information of the first mobility management unit according to measurement statistic information that is of the UE in the first mobility management unit and determined by the first determining unit 1001, where the radio network information may include at least one type of the following information: signal strength information of the first cell in the first mobility management unit, signal strength information of at least one neighboring cell of the first cell in the first mobility management unit, or a statistic value of at least one key performance indicator KPI in the first mobility management unit.

The KPI may be at least one of the following: a call drop rate, channel usage, a handover success rate, or an access success rate.

Specifically, for a manner in which the second determining unit 1002 determines the radio network information of the first mobility management unit, refer to related description in the foregoing method embodiments, and details are not described herein again.

By using the network device in this embodiment of the present invention, a granularity of acquiring and managing radio network information in a cell is per mobility management unit, and for a complex cell coverage environment, difference about neighboring cells between different areas of the cell and difference about interference between different areas of the cell can be well specified and managed.

Further, to comprehensively acquire information about multiple communications networks, the network device may further include the following optional units: a third determining unit 1003 and an information combination unit 1004.

The third determining unit 1003 is configured to determine that the first mobility management unit includes a second mobility management unit, where the second mobility management unit is an area obtained by dividing a second cell; and the second cell and the first cell may be cells that belong to the same system, or cells that belong to different systems. For example, the first cell is a GSM cell 1 and the second cell is a UMTS cell 1, or the first cell is an LTE cell 1 and the second cell is an LTE cell 2.

A coverage area of the second mobility management unit is less than or equal to that of the second cell. That the first mobility management unit includes a second mobility management unit may be that the second mobility management unit is smaller than the first mobility management unit and located within the first mobility management unit, or the second mobility management unit is the same as the first mobility management unit. The second mobility management unit may be obtained by dividing the second cell in multiple manners, and the second mobility management unit has an area feature of the covered area.

For example, the second mobility management unit may be an area obtained by dividing the second cell according to geographical location information of the second cell; or the second mobility management unit may be an area obtained by dividing the second cell according to a signal strength feature of a cell in a second cell set. For a dividing manner, refer to the description in the foregoing method embodiments, and details are not described herein again.

Specifically, for a manner in which the third determining unit 1003 determines that the first mobility management unit includes the second mobility management unit, also refer to related description in the foregoing method embodiment, and details are not described herein again.

The information combination unit 1004 is configured to combine radio network information of the second mobility management unit with the radio network information of the first mobility management unit, where the radio network information of the second mobility management unit may be determined according to the description in the foregoing method embodiments, and details are not described herein again.

Specifically, for a manner in which the information combination unit 1004 combines the radio network information of the second mobility management unit with the radio network information of the first mobility management unit, refer to related description in the foregoing method embodiments, and details are not described herein again.

In the network device in this embodiment of the present invention, radio network information determined for a same area in various standards is combined into one mobility management unit for unified management, so that radio network information of mobility management units can be more complete when communications networks of multiple standards are all covered.

Further, the network device may further include the following optional unit: a resource management unit 1005, configured to execute radio resource management according to the radio network information of the first mobility management unit.

The resource management unit 1005 is specifically configured to control the UE in the first mobility management unit to complete access or handover in the first cell or in a neighboring cell of the first cell, where the neighboring cell of the first cell and the first cell may be cells that belong to the same system, or cells that belong to different systems.

Specifically, for a manner in which the resource management unit 1005 performs radio resource management, refer to related description in the foregoing method embodiments, and details are not described herein again.

By using the network device in this embodiment, radio resource management is performed according to radio network information of a mobility management unit in which a UE is located, there is no need to wait for a measurement result of the UE on a neighboring cell, thereby reducing latency of access or handover and enhancing user experience.

For a specific interaction process between the foregoing units, refer to the description in the method embodiments, and details are not described herein again.

In this embodiment, the foregoing units may be implemented by using a processor or the like.

The network device in this embodiment may be at least one type of base station devices such as an RNC, a BSC, an eNodeB, or an AC, or may be a centralized control device. A difference lies in that when the network device is a centralized control device, the centralized control device may be connected to at least one base station device such as the RNC, the BSC, the eNodeB, or the AC, and the base station devices transfer, to the centralized control device, preset information of a cell, such as geographical location information and a neighboring cell, and measurement information of the UE.

Figure 11:
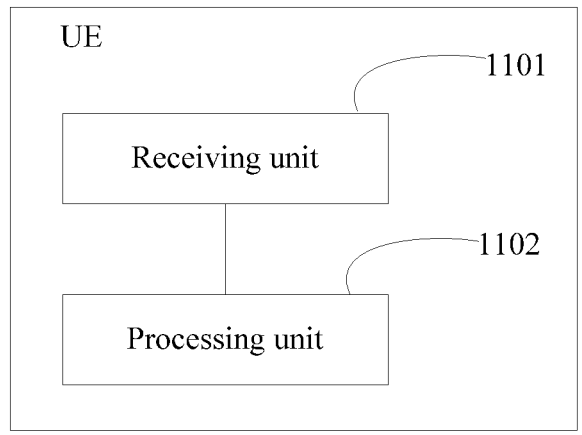
FIG. 11 is a structural diagram of a user equipment UE according to another embodiment.

FIG. 11 shows a user equipment UE according to another embodiment. As shown in FIG. 11, the user equipment UE includes: a receiving unit 1101, configured to receive control information of a network device; and a processing unit 1102, configured to complete access or handover in a first cell or a neighboring cell of the first cell according to the control information that is received by the receiving unit 1101 in the first cell, where the control information is determined by the network device according to radio network information of a first mobility management unit in which the UE is located.

The radio network information of the first mobility management unit includes at least one type of the following information: signal strength information of the first cell in the first mobility management unit, signal strength information of at least one neighboring cell of the first cell in the first mobility management unit, or a statistic value of at least one key performance indicator KPI in the first mobility management unit.

The first mobility management unit and the radio network information thereof are determined by the network device according to method steps in the foregoing method embodiments, and the first mobility management unit in which the UE is located is also determined by the network device by referring to the foregoing method embodiments.

This has been described in the foregoing method embodiments, so details are not described herein again.

By using the UE in this embodiment, there is no need to start measurement of a neighboring cell; instead, a network device performs radio resource management directly according to radio network information of a mobility management unit in which the UE is located, thereby reducing latency of access or handover and enhancing user experience.

Figure 12:
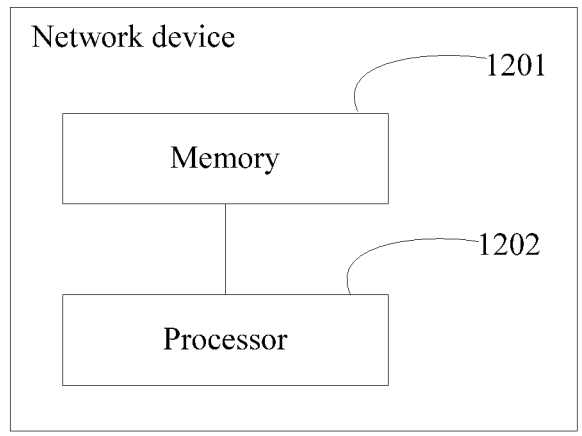
FIG. 12 is a structural diagram of a network device according to another embodiment.

FIG. 12 shows a network device according to another embodiment. As shown in FIG. 12, the network device in this embodiment includes: a memory 1201 and a processor 1202 connected to the memory 1201, where the memory 1201 stores a set of program code, and the memory 1201 may include a non-volatile memory. The processor 1202 may be a central processing unit (CPU) or an application specific integrated circuit (ASIC), or may be configured to be one or more integrated circuits that implement the embodiments of the present invention. The processor 1202 is configured to invoke the program code stored in the memory 1201 to execute the following operations: determining that a user equipment UE exists in a first mobility management unit, where the first mobility management unit is an area obtained by dividing a first cell, where the first cell may be a cell in a communications system of any standard, for example, a cell in a GSM system, a UMTS system, or an LTE system; and determining radio network information of the first mobility management unit according to measurement statistic information of the UE in the first mobility management unit, where the radio network information may include at least one type of the following information: signal strength information of the first cell in the first mobility management unit, signal strength information of at least one neighboring cell of the first cell in the first mobility management unit, or a statistic value of at least one KPI in the first mobility management unit.

The KPI may be at least one of the following: a call drop rate, channel usage, a handover success rate, or an access success rate.

Optionally, the following operations may be further included: determining that the first mobility management unit includes a second mobility management unit, where the second mobility management unit is an area obtained by dividing a second cell; and combining radio network information of the second mobility management unit with the radio network information of the first mobility management unit.

Optionally, on the basis of the foregoing operations, and the foregoing operations and the optional operations, the following operation may be further included: executing radio resource management according to the radio network information of the first mobility management unit.

The radio resource management includes controlling the UE in the first mobility management unit to complete access or handover in the first cell or in a neighboring cell of the first cell, where the neighboring cell of the first cell and the first cell may be cells that belong to the same system, or cells that belong to different systems.

It should be noted that, for a technical solution specifically implemented by the processor 1202 by invoking the program code stored in the memory 1201, refer to the foregoing method embodiments, and implementation principles and technical effects thereof are similar. For details, refer to related records in the foregoing embodiments, and details are not described herein again.

Figure 13:
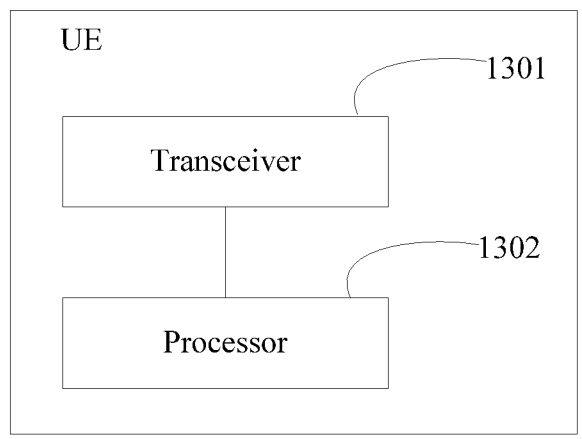
FIG. 13 is a structural diagram of a user equipment UE according to another embodiment.

FIG. 13 shows a user equipment UE according to another embodiment As shown in FIG. 13, the user equipment UE includes: a transceiver 1301, configured to receive and transmit control information of a network device; and a processor 1302, configured to complete access or handover in a first cell or a neighboring cell of the first cell according to the control information that is received by the transceiver 1301 in the first cell, where the control information is determined by the network device according to radio network information of a first mobility management unit in which the UE is located. The radio network information of the first mobility management unit includes at least one type of the following information: signal strength information of the first cell in the first mobility management unit, signal strength information of at least one neighboring cell of the first cell in the first mobility management unit, or a statistic value of at least one key performance indicator KPI in the first mobility management unit.

The first mobility management unit and the radio network information thereof are determined by the network device according to method steps in the foregoing method embodiments, and the first mobility management unit in which the UE is located is also determined by the network device by referring to the foregoing method embodiments, and details are not described herein again.

By using the UE in this embodiment, there is no need to start measurement of a neighboring cell; instead, a network device performs radio resource management directly according to radio network coverage information of a mobility management unit in which the UE is located, thereby reducing latency of access or handover and enhancing user experience.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or a disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A method, comprising:
   determining, by a network-side device, that a user equipment (UE) exists in a first mobility management unit, wherein the first mobility management unit is an area obtained by dividing a first cell;
   after determining that the UE exists in the first mobility management unit, collecting, by the network-side device, one or more measurements of the UE in the first mobility management unit in a statistical period, and determining measurement statistic information of the UE in the first mobility management unit according to the collected one or more measurements; and
   determining, by the network-side device, radio network information of the first mobility management unit according to the measurement statistic information of the UE in the first mobility management unit, wherein the radio network information comprises one or more types of the following information: signal strength information of the first cell in the first mobility management unit, signal strength information of a neighboring cell of the first cell in the first mobility management unit, or a statistic value of a key performance indicator (KPI) in the first mobility management unit.

2. The method according to claim 1, wherein:
   the first mobility management unit is an area obtained by dividing the first cell according to a signal strength feature of a cell in a first cell set, the first cell set comprising the first cell; and
   determining that a UE exists in a first mobility management unit comprises:
   determining, by the network-side device, according to a signal strength of the cell in the first cell set and obtained from the UE, that the UE exists in the first mobility management unit.

3. The method according to claim 2, wherein:
   the signal strength feature of the cell in the first cell set comprises a signal strength range of the cell in the first cell set; and
   determining that the UE exists in the first mobility management unit comprises:
   determining, by the network-side device, that the UE exists in the first mobility management unit, in response to the signal strength that is of the cell in the first cell set and obtained from the UE being within a signal strength range of a corresponding cell in the first cell set in the first mobility management unit.

4. The method according to claim 2, wherein:
   the signal strength feature of the cell in the first cell set comprises a signal strength comparison relationship of cells in the first cell set; and
   determining that the UE exists in the first mobility management unit comprises:
   determining, by the network-side device, that the UE exists in the first mobility management unit, in response to a comparison relationship of signal strength that is of cells in the first cell set and obtained from the UE meeting a signal strength comparison relationship of corresponding cells in the first cell set in the first mobility management unit.

5. The method according to claim 2, wherein:
   the signal strength feature of the cell in the first cell set comprises a signal strength range of the cell in the first cell set and a signal strength comparison relationship of cells in the first cell set; and
   determining, by the network-side device that the UE exists in the first mobility management unit comprises:
   determining, by the network-side device, that the UE exists in the first mobility management unit, in response to the signal strength that is of the cell in the first cell set and obtained from the UE being within a signal strength range of a corresponding cell in the first cell set in the first mobility management unit, and a comparison relationship of signal strength that is of cells in the first cell set and obtained from the UE meeting a signal strength comparison relationship of corresponding cells in the first cell set in the first mobility management unit.

6. The method according to claim 1, wherein:
   the first mobility management unit is an area obtained by dividing the first cell according to geographical location information of the first cell; and
   determining that a UE exists in a first mobility management unit comprises:
   determining, by the network-side device, that the UE exists in the first mobility management unit in response to a geographical location in which the UE is located being within a geographical range of the first mobility management unit.

7. The method according to claim 1, wherein the method further comprises:
   determining, by the network-side device, that the first mobility management unit comprises a second mobility management unit, wherein the second mobility management unit is an area obtained by dividing a second cell; and
   combining, by the network-side device, radio network information of the second mobility management unit with the radio network information of the first mobility management unit.

8. The method according to claim 7, wherein the second cell and the first cell are cells that belong to different systems.

9. The method according to claim 7, wherein obtaining the second mobility management unit by dividing the second cell comprises:
obtaining the second mobility management unit by dividing the second cell according to geographical location information of the second cell; or
obtaining the second mobility management unit by dividing the second cell according to a signal strength feature of a cell in a second cell set, wherein the second cell set comprises at least the second cell.

10. The method according to claim 1, wherein the method further comprises:
executing, by the network-side device, radio resource management according to the radio network information of the first mobility management unit.

11. A device, comprising:
a memory; and
a processor coupled to the memory, wherein the processor is configured to:
determine that a user equipment (UE) exists in a first mobility management unit, wherein the first mobility management unit is an area obtained by dividing a first cell;
after determining that the UE exists in the first mobility management unit, collect one or more measurements of the UE in the first mobility management unit in a statistical period, and determine measurement statistic information of the UE in the first mobility management unit according to the collected one or more measurements; and
determine radio network information of the first mobility management unit according to the measurement statistic information of the UE in the first mobility management unit, wherein the radio network information comprises one or more types of the following information: signal strength information of the first cell in the first mobility management unit, signal strength information of a neighboring cell of the first cell in the first mobility management unit, or a statistic value of a key performance indicator (KPI) in the first mobility management unit;
wherein the device is a network-side device.

12. The device according to claim 11, wherein:
the first mobility management unit is an area obtained by dividing the first cell according to a signal strength feature of a cell in a first cell set, wherein the first cell set comprises the first cell; and
the processor is further configured to determine, according to signal strength that is of the cell in the first cell set and obtained from the UE, that the UE exists in the first mobility management unit.

13. The device according to claim 12, wherein the signal strength feature of the cell in the first cell set comprises a signal strength range of the cell in the first cell set; and
the processor is further configured to determine that the UE exists in the first mobility management unit in response to the signal strength that is of the cell in the first cell set and obtained from the UE being within a signal strength range of a corresponding cell in the first cell set in the first mobility management unit.

14. The device according to claim 12, wherein:
the signal strength feature of the cell in the first cell set comprises a signal strength comparison relationship of cells in the first cell set; and
the processor is further configured to determine that the UE exists in the first mobility management unit in response to a comparison relationship of signal strength that is of cells in the first cell set and obtained from the UE meeting a signal strength comparison relationship of corresponding cells in the first cell set in the first mobility management unit.

15. The device according to claim 12, wherein:
the signal strength feature of the cell in the first cell set comprises a signal strength range of the cell in the first cell set and a signal strength comparison relationship of cells in the first cell set; and
the processor is further configured to determine that the UE exists in the first mobility management unit in response to the signal strength that is of the cell in the first cell set and obtained from the UE being within a signal strength range of a corresponding cell in the first cell set in the first mobility management unit, and a comparison relationship of signal strength that is of cells in the first cell set and obtained from the UE meeting a signal strength comparison relationship of corresponding cells in the first cell set in the first mobility management unit.

16. The device according to claim 11, wherein:
the first mobility management unit is an area obtained by dividing the first cell according to geographical location information of the first cell; and
the processor is further configured to determine that the UE exists in the first mobility management unit in response to a geographical location in which the UE is located being within a geographical range of the first mobility management unit.

17. The device according to claim 11, wherein the processor is further configured to:
determine that the first mobility management unit comprises a second mobility management unit, wherein the second mobility management unit is an area obtained by dividing a second cell; and
combine radio network information of the second mobility management unit with the radio network information of the first mobility management unit.

18. The device according to claim 17, wherein obtaining the second mobility management unit by dividing the second cell comprises:
obtaining the second mobility management unit by dividing the second cell according to geographical location information of the second cell; or
obtaining the second mobility management unit by dividing the second cell according to a signal strength feature of a cell in a second cell set, wherein the second cell set comprises the second cell.

19. The device according to claim 17, wherein the processor is further configured to execute radio resource management according to the radio network information of the first mobility management unit.

20. The device according to claim 11, wherein the device comprises one or more of the following: a radio network controller (RNC), a base station controller (BSC), an evolved NodeB (eNodeB), an access controller (AC), or a centralized control device.

* * * * *